United States Patent
Allouche

(10) Patent No.: US 9,665,885 B1
(45) Date of Patent: May 30, 2017

(54) METHODS AND SYSTEMS FOR TARGETED DEMAND GENERATION BASED ON IDEAL CUSTOMER PROFILES

(71) Applicant: Metadata, Inc., San Francisco, CA (US)

(72) Inventor: Gil David Allouche, San Francisco, CA (US)

(73) Assignee: Metadata, Inc., San Francisco, CA (US)

( * ) Notice: Subject to any disclaimer, the term of this patent is extended or adjusted under 35 U.S.C. 154(b) by 0 days.

(21) Appl. No.: 15/297,341

(22) Filed: Oct. 19, 2016

Related U.S. Application Data

(60) Provisional application No. 62/380,956, filed on Aug. 29, 2016.

(51) Int. Cl.
G06Q 30/00 (2012.01)
G06Q 30/02 (2012.01)

(52) U.S. Cl.
CPC ..... *G06Q 30/0251* (2013.01); *G06Q 30/0276* (2013.01)

(58) Field of Classification Search
None
See application file for complete search history.

(56) References Cited

U.S. PATENT DOCUMENTS 6,115,690 A   9/2000   Wong
6,658,391 B1  12/2003  Williams et al.

(Continued)

FOREIGN PATENT DOCUMENTS

WO   0137152 A1    5/2001
WO   2007112411 A2  10/2007

(Continued)

OTHER PUBLICATIONS

Jochemsen, M.C., 2014, "An exploration of content-driven commerce," University of Twente website, available at http://essay.utwente.nl/66408/ Accessed on Sep. 26, 2016.

(Continued)

*Primary Examiner* — Matthew T Sittner
(74) *Attorney, Agent, or Firm* — American Patent Agency PC; Daniar Hussain; Xiaomeng Shi

(57) ABSTRACT

Disclosed are methods and systems for generating ideal and opt-in business leads utilizing targeted advertising campaigns. The method comprises first retrieving and statistically analyzing qualified leads from a CRM system to identify an ideal customer profile (ICP), and retrieving candidates leads that either match the ICP or are lookalikes from one or more lead data sources. Next, generating test advertising campaigns, receiving feedback on the test advertising campaigns from candidate leads in test target groups, scoring each test advertising campaign based on received feedback, and selecting ideal business leads that match a profile of a test target group that responded to a test advertising campaign with a high score. Furthermore, generating main advertising campaigns, receiving responses, and generating ideal and opt-in business leads by selecting ideal business leads that responded affirmatively. The present invention provides a closed-loop architecture to produce qualified, ideal, and opt-in leads for B2B companies.

12 Claims, 16 Drawing Sheets

(56) References Cited

U.S. PATENT DOCUMENTS

| | | | |
|---|---|---|---|
| 6,697,824 B1 | | 2/2004 | Bowman-Amuah |
| 6,868,389 B1* | | 3/2005 | Wilkins .............. G06Q 30/0201 |
| | | | 705/1.1 |
| 7,003,476 B1 | | 2/2006 | Samra et al. |
| 7,047,206 B1* | | 5/2006 | Schultze .......... G06Q 10/06311 |
| | | | 705/7.13 |
| 7,136,448 B1 | | 11/2006 | Venkataperumal et al. |
| 7,246,083 B2 | | 7/2007 | Bibelnieks et al. |
| 7,340,411 B2 | | 3/2008 | Cook |
| 7,430,535 B2 | | 9/2008 | Dougherty et al. |
| 7,499,870 B1* | | 3/2009 | Petrossi ................. G06Q 10/00 |
| | | | 705/7.32 |
| 7,844,489 B2 | | 11/2010 | Landesmann |
| 7,917,384 B2 | | 3/2011 | Hubsher |
| 8,135,607 B2 | | 3/2012 | Williams et al. |
| 8,271,313 B2 | | 9/2012 | Williams et al. |
| 8,296,174 B2 | | 10/2012 | Raffel et al. |
| 8,700,460 B2 | | 4/2014 | Khetrapal et al. |
| 8,762,193 B2 | | 6/2014 | Maga et al. |
| 8,825,509 B2 | | 9/2014 | Yerkes et al. |
| 9,082,087 B2 | | 7/2015 | Fernandez et al. |
| 9,129,292 B2 | | 9/2015 | Almeida et al. |
| 9,215,423 B2 | | 12/2015 | Kimble et al. |
| 9,419,850 B2 | | 8/2016 | Longo |
| 2003/0004787 A1* | | 1/2003 | Tripp ...................... G06Q 30/02 |
| | | | 705/7.34 |
| 2003/0179870 A1 | | 9/2003 | Desa et al. |
| 2004/0093343 A1 | | 5/2004 | Lucas et al. |
| 2004/0225555 A1 | | 11/2004 | Persidis et al. |
| 2005/0060313 A1* | | 3/2005 | Naimat .................. G06Q 30/02 |
| 2006/0047571 A1 | | 3/2006 | Garcia et al. |
| 2006/0074747 A1 | | 4/2006 | Kline et al. |
| 2006/0100894 A1 | | 5/2006 | Weiner et al. |
| 2006/0242000 A1* | | 10/2006 | Giguiere ................ G06Q 30/02 |
| | | | 705/7.32 |
| 2007/0233566 A1* | | 10/2007 | Zlotin .................... G06Q 30/02 |
| | | | 705/14.41 |
| 2008/0172344 A1 | | 7/2008 | Eager et al. |
| 2009/0030801 A1* | | 1/2009 | Meggs .................. G06Q 30/02 |
| | | | 705/14.39 |
| 2009/0112687 A1 | | 4/2009 | Blair et al. |
| 2009/0164306 A1* | | 6/2009 | Petrossi ................. G06Q 10/00 |
| | | | 705/7.33 |
| 2009/0171761 A1* | | 7/2009 | Noy ....................... G06Q 30/02 |
| | | | 705/14.4 |
| 2010/0274661 A1* | | 10/2010 | Aaltonen ............... G06Q 30/02 |
| | | | 705/14.42 |
| 2010/0332290 A1* | | 12/2010 | Narvaez ........... G06Q 10/06393 |
| | | | 705/7.39 |
| 2010/0332291 A1* | | 12/2010 | Smith .................... G06Q 30/02 |
| | | | 705/7.29 |
| 2011/0066562 A1* | | 3/2011 | Stapleton ............... G06F 21/604 |
| | | | 705/317 |
| 2011/0078073 A1* | | 3/2011 | Annappindi ............ G06Q 40/02 |
| | | | 705/38 |
| 2011/0238485 A1* | | 9/2011 | Haumont ............... G06Q 30/02 |
| | | | 705/14.41 |
| 2011/0282730 A1 | | 11/2011 | Tarmas |
| 2012/0130794 A1 | | 5/2012 | Strieder |
| 2012/0246010 A1 | | 9/2012 | Foth et al. |
| 2012/0253924 A1 | | 10/2012 | Giese et al. |
| 2012/0271709 A1 | | 10/2012 | Ogawa |
| 2012/0278091 A1* | | 11/2012 | Yaseen .................. G06Q 30/02 |
| | | | 705/1.1 |
| 2013/0041749 A1* | | 2/2013 | Petrossi ................. G06Q 10/00 |
| | | | 705/14.42 |
| 2013/0157609 A1* | | 6/2013 | Vainik .................. G06F 11/0781 |
| | | | 455/404.1 |
| 2013/0173638 A1 | | 7/2013 | Ben-Reuven |
| 2013/0204823 A1* | | 8/2013 | Treiser ..................... G06N 5/02 |
| | | | 706/46 |
| 2013/0246160 A1* | | 9/2013 | Farahat .................. G06Q 30/02 |
| | | | 705/14.43 |
| 2013/0253981 A1 | | 9/2013 | Lipka et al. |
| 2013/0311235 A1 | | 11/2013 | Jaros, Anthony et al. |
| 2014/0058826 A1* | | 2/2014 | Ogawa .................. G06Q 30/02 |
| | | | 705/14.43 |
| 2014/0081740 A1 | | 3/2014 | Lipka et al. |
| 2014/0164084 A1* | | 6/2014 | Battles .................. G06Q 40/02 |
| | | | 705/14.17 |
| 2014/0278759 A1* | | 9/2014 | Lawson ............. G06Q 30/0201 |
| | | | 705/7.29 |
| 2015/0019305 A1* | | 1/2015 | Gorawala .......... G06Q 30/0241 |
| | | | 705/14.4 |
| 2016/0132953 A1 | | 5/2016 | Davar et al. |
| 2016/0189163 A1* | | 6/2016 | Jonsson ............... G06Q 30/016 |
| | | | 705/304 |
| 2016/0212266 A1* | | 7/2016 | Soundar .............. H04M 3/5235 |
| 2016/0314491 A1* | | 10/2016 | Shani .................. G06Q 30/0275 |
| 2016/0314498 A1* | | 10/2016 | Srivastava ......... G06Q 30/0269 |
| 2016/0335659 A1* | | 11/2016 | Lewis .................... G06Q 30/08 |

FOREIGN PATENT DOCUMENTS

| | | |
|---|---|---|
| WO | 2011019731 A2 | 2/2011 |
| WO | 2015001558 A1 | 1/2015 |

OTHER PUBLICATIONS

Murphy, Lincoln, "Ideal Customer Profile Framework," blog article, originally published in 2014, available at: http://sixteenventures.com/ideal-customer-profile, last accessed on Apr. 4, 2017.

Subramanyan, Vignesh, "Stop Yelling At Prospects: How to Build an Ideal Customer Profile," Business 2 Community Blog article, Nov. 2, 2016, available at: http://www.business2community.com/marketing/stop-yelling-prospects-build-ideal-customer-profile-01696247#JGvQbxeIE2zHQxU.97, last accessed on Apr. 4, 2017.

Casey, Steven, et al., "Vendor Landscape: Account-Based Marketing, Q4 2016, Point Solutions Proliferate Amid Claims of Platform Leadership," Report, Oct. 18, 2016, Forrester Research, Cambridge, MA, US.

* cited by examiner

1100

1110 SETTING UP TARGET SET

1120 COMPANY TARGETING

Location   Industry

Employees   Revenue

OR

Technology (FE and/or BE)

OR

Domain List

OR

Salesforce (default)

1130 PERSONA TARGETING

Job Title   Seniority

Other properties that we can find lookalikes by

OR

Salesforce (default)

1310 EXEMPLARY TEST CAMPAIGN

1320 CAMPAIGN

Spend Cap  2000  $

Start Date  08/08/2016    End Date  09/01/2016

Facebook Pages  Lightbend

1330 TARGETING

Hubspot Landing Pages    marketing automation compar...

Hubspot Thank You Pages  thank-you-marketing-automati...

Custom Audiences  Lookalike (US, 2%) - Align_Pilot_Lookalike_Audience_930-EDA21179(3915900)

1340 CREATIVE

Ad Headline     Example headline

Ad Text         Example text

Ad Description  Example description

Website URL     http://offers.metadata.io/marketing-automation-

Display URL     http://offers.metadata.io

1350 AD CREATIVES

Choose File   No file chosen

CREATE CAMPAIGN

Fig. 13

METHODS AND SYSTEMS FOR TARGETED DEMAND GENERATION BASED ON IDEAL CUSTOMER PROFILES

REFERENCE TO RELATED APPLICATIONS

This application is a non-provisional of and claims the benefit of provisional application having U.S. Ser. No. 62/380,956, filed on 29 Aug. 2016, and entitled "*Methods and Systems Utilizing an Engine for Targeted Demand Generation Based on Ideal Customer Profiles*," the entire disclosure of which is hereby incorporated by reference in its entireties herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the present invention are in the field of customer profiling and targeted advertising, and pertain particularly to methods and systems for targeted demand generation.

BACKGROUND OF THE INVENTION

The statements in the background of the invention are provided to assist with understanding the invention and its applications and uses, and may not constitute prior art.

Business-to-business (B2B) companies struggle to generate a predictable volume of qualified leads. The problem exists since there are many marketing activities or sources that generate leads, yet it is hard to consistently attribute the marketing activities to leads generated. Exemplary marketing activities include events, content marketing, Search Engine Optimization (SEO), organic traffic, advertising, email marketing, and many others.

One way to generate a consistent number of leads of certain quality with certain prospect profile is by advertising. However, due to advertising fraud such as bots, inaccurate data in advertising channels such as in cookies from Facebook, LinkedIn, Google, and so on, and inaccurate attribute data such as wrong age or location in social media networks such as Facebook, advertising tends to generate a wide spectrum of leads in terms of quality, and a fluctuation in price per lead.

Meanwhile, it is common practice for B2B companies to utilize sales force automation (SFA), a technique of using software to automate the business tasks of sales, including order processing, contact management, information sharing, inventory monitoring and control, order tracking, customer management, sales forecast analysis, and employee performance evaluation, and even marketing. SFA is often carried out using Customer Relationship Management (CRM) software. Many CRM and SFA systems were designed in the 1990s, before social networking became ubiquitous, thus such systems often reflect the conventional way business operates where a salesperson initiates actions, instead of having the customer taking initiatives instead. Such tools merely streamline business processes, but are not capable of seizing on as many potential opportunities as possible. In the case where system data are not up-to-date, there could be lags and missed opportunities. Also, while some systems could generate lookalike clients to existing customers, they do so by relying on internal information only, and are thus limited in capturing potential clients not already in the system.

Moreover, marketers are often under the impression that all digital marketing tools necessary for growth and for generating new leads roll up under the hood of marketing automation. This misconception leaves many marketers with sophisticated tools to automate the middle of their funnel, yet without generating new leads to nurture in the first place. As a result, marketers end up buying lists of email addresses to nurture instead of generating inbound leads, which are customer initiated, and reflect a higher level of customer interest. While outbound marketing to large email lists seems like a quick fix, this is not a long-term solution for sustained success, nor does it create any fertile ground for a healthier, longer relationship between B2B companies and their future customers.

More importantly, conventional marketing and sales automation software lack the ability to advertise to potential clients in specialized or targeted ways, are unable to receive customer feedback, and are non-ideal as advertising avenues. Therefore, obtaining reliable business client leads with conventional marketing and sales automation software is often time consuming and expensive.

Therefore, in view of the aforementioned difficulties, it would be an advancement in the state of the art to provide systems and methods for generating high-quality sales leads for B2B companies.

It is against this background that the present invention was developed.

BRIEF SUMMARY OF THE INVENTION

The inventors of the present invention have created methods and systems for determining and discovering business clients matching ideal customer profiles for targeted advertising campaigns.

More specifically, in one aspect, one embodiment of the present invention is a system for generating ideal and opt-in business leads utilizing targeted advertising campaigns. The system includes a processor and a non-transitory, computer-readable storage medium for storing program code. The program code, when executed by the processor, causes the process to perform the steps of retrieving multiple qualified leads from a Customer Relationship Management (CRM) system; identifying an ideal customer profile (ICP) by statistically analyzing the retrieved qualified leads; and retrieving a first batch of candidate leads that match the identified ICP with a first high match rate, from one or more lead data sources, where each of the one or more lead data sources is selected from the group consisting of a system database, one or more third party databases, and one or more channel advertising partners. The program further causes the processor to perform the steps of retrieving a second batch of candidate leads as lookalikes of the first batch of candidate leads from the one or more lead data sources; and generating one or more test advertising campaigns directed to multiple test target groups, where each test target group is a subset of a union of the first and second batches of candidate leads. The program further causes the processor to perform the steps of receiving feedback on the one or more test advertising campaigns from the candidate leads in the test target groups; generating a campaign score for each of the one or more test advertising campaigns based on the feedback received from candidate leads in the test target groups; selecting multiple ideal business leads from the first and second batches of candidate leads, where an ideal business lead matches a profile of a test target group that responded to a test advertising campaign with a high campaign score; automatically generating one or more main advertising campaigns to the ideal business leads using the one or more channel advertising partners; receiving responses from one or more ideal business leads; and generating ideal and opt-in business leads by selecting from the ideal business leads that responded affirmatively to the generated one or more main advertising campaigns.

In some embodiments of the present invention, the program code further causes the processor to perform the steps of receiving feedback on the one or more test advertising campaigns from a user regarding the candidate leads in the test target groups or from the CRM system corresponding to the candidate leads in the test target groups, where the campaign score for each of the one or more test advertising campaigns is also based on the feedback received from the user regarding the candidate leads in the test target groups, or response from the CRM system corresponding to candidate leads in the test target groups.

In some embodiments of the present invention, the program code further causes the processor to enrich the qualified leads by obtaining multiple primary keys for the qualified leads from one or more CRM systems; obtaining multiple secondary keys using the primary keys as keys into other data sources, where the secondary keys serve as primary keys for the other data sources; and populating one or more fields associated with the qualified leads with attribute values retrieved from the other data sources using the secondary keys, where the one or more fields associated with the qualified leads are analyzed for the identification of the ICP and for the retrieval of the second batch of candidate leads as lookalikes. In some embodiments, each primary key is the name, email, domain name, location, company name, company rank, job function, or company role.

In some embodiments of the present invention, the program code further causes the processor to determine one or more clusters within the qualified leads by statistically analyzing one or more attributes of the qualified leads; and generate one or more scores indicating the probability of future transactions and transaction amounts for each of the one or more clusters within the qualified leads, where the identification of the ICP is based on a weighted combination of the one or more lead scores. In some embodiments, the statistical analysis is based on KMeans, regression analysis, decision tree analysis, Bayesian analysis, random forest, or weighted signal based on the one or more lead scores. In some embodiments, the statistical analysis is based on machine learning of profile attributes of leads with high lead scores, and profile attributes of leads in the test target groups corresponding to high campaign scores.

In some embodiments of the present invention, the first high match rate and the second high match rate are defined in terms of a match rate signal that measures a similarity of a lead to the ICP. In some embodiments, the match rate signal is a percentage of a number of attributes of the lead that satisfy attribute conditions specified by the ICP or a weighted combination of degrees of similarities between lead attribute and the ICP.

In some embodiments of the present invention, the test advertising campaigns or test target groups are compared using A/B testing, indirect testing, probabilistic testing, or comparative testing. In some embodiments, the generation of the one or more main advertising campaigns to the ideal business leads is by selecting from the test advertising campaign according to results of an A/B test. In some embodiments, each test advertising campaign or main advertising campaigns is associated with at least one of a campaign offer, an advertising channel partner, and a cost per lead. In some embodiments, each test advertising campaign or main advertising campaign comprises multiple sub-campaigns, where each sub-campaign is associated with multiple landing pages, and one or more test target groups comprising multiple candidate leads meeting multiple given criteria.

In some embodiments of the present invention, the program code further causes the processor to determine whether the campaign score generated for the test advertising campaign is below a target threshold; and, in response to determining that the campaign score generated for the test advertising campaign is below the target threshold, eliminate the test advertising campaign and the generated campaign score from the selection of the ideal business leads. In some embodiments, the campaign score generated for each test advertising campaign comprises one or more components, where all components are tested and grouped by their values. In some embodiments, each component of the campaign score for each of the one or more test advertising campaigns is configurable, and is visit-to-form-submission conversion percentage, total budget, advertising cost per lead (CPL), match rate signal, candidate lead voluntary opt-in weight, previous or expected booking amount, time to booking, opportunity, opportunity amount, opportunity chance, user manual feedback, or lead scores provided by the CRM. In some embodiments, a candidate lead's voluntary opt-in weight indicates a level of interest of the candidate lead based on the candidate lead's feedback to a sub-campaign, and the candidate lead's voluntary opt-in weight is non-zero if the candidate lead opts-in by clicking on a landing page.

In another aspect, the present invention is a non-transitory, computer-readable storage medium storing executable instructions, which when executed by a processor, causes the processor to perform a process for generating ideal and opt-in leads, the instructions causing the processor to perform the aforementioned steps.

In another aspect, the present invention is a system for generating ideal and opt-in leads, the system comprising a user device having a processor, a display, and a first memory; a server comprising a second memory and a data repository; a telecommunications-link between the user device and the server; and a plurality of computer codes embodied on the memory of the user-device and the server, the plurality of computer codes which when executed causes the server and the user-device to execute a process comprising the aforementioned steps.

In yet another aspect, the present invention is a computerized server comprising at least one processor, memory, and a plurality of computer codes embodied on the memory, the plurality of computer codes which when executed causes the processor to execute a process comprising the aforementioned steps.

Yet other aspects and embodiments of the present invention include the methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 11 is an illustrative campaign Targeting Sets setup page for one embodiment of the invention.

FIG. 13 is an exemplary test Campaign Setup page in one embodiment of the invention.

DETAILED DESCRIPTION OF THE INVENTION

Illustrative Definitions

Figure 1:
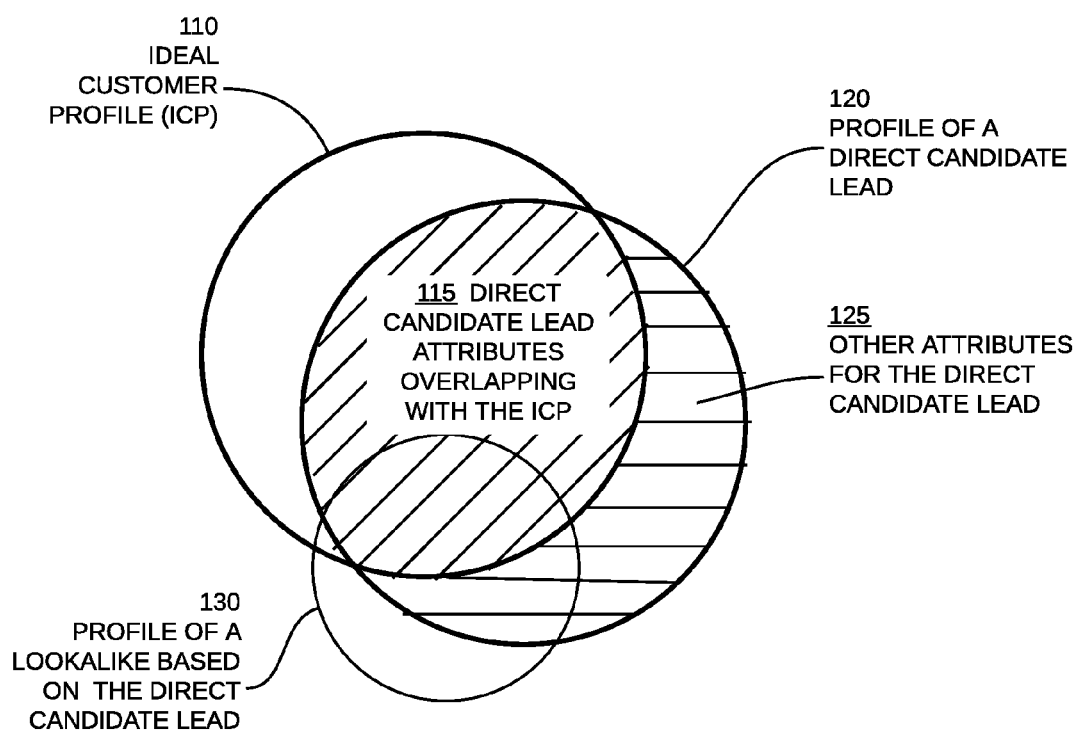
FIG. 1 is an illustrative profile attribute Venn diagram showing attributes of an ICP, a direct candidate lead, and a lookalike based on the direct candidate lead, according to one embodiment of the present invention.

Some illustrative definitions are provided to assist in understanding the present invention, but these definitions are not to be read as restricting the scope of the present invention. The terms may be used in the form of nouns, verbs or adjectives, within the scope of the definitions.

"METADATA" is a trademark name carrying embodiments of the present invention, and hence, the aforementioned trademark name may be interchangeably used in the specification and drawing to refer to the products/services offered by embodiments of the present invention. The term METADATA may also be used in this specification to describe the overall system and processes of the invention, as well as the company that provides such services.

"User" or "System User" refers to an end user of the present invention, i.e. a user or customer of METADATA. In the present disclosure, a user may be a person, a device, a company or business that the person or device belongs to, or a sales or marketing team within the company or business.

"Company" or "Business" is an organization or entity where goods and services are exchanged for one another or for money, or for achieving other objectives. A company or a business can be privately owned, not-for-profit, or state-owned, and it can take the form of sole proprietorship, partnership, limited liability, corporation, or public limited company.

"Business client", "Client", "Business customer", or "Customer" is a customer of a user of METADATA. In the present disclosure, a business client, client, business customer, or customer may refer to either a company or business, or the persons within.

"Lead", "Contact", or "Prospect" is a prospective consumer of a product or service, and a potential or an actual existing customer of a user of METADATA. An existing customer whom the user has previously served may be suitable for new products or services currently being marketed, thus may be potential leads and prospects for targeted marketing campaigns. A lead, contact, or prospect mainly refers to individuals, but may also refer to the company or business an individual belongs to.

"Direct candidate lead" is a lead obtained by directly comparing attributes of leads from various data sources to a given Ideal Customer Profile (ICP), and selecting those leads that match the ICP with a high match rate.

"Qualified lead" is a lead that meets a given set of qualification criteria, and is often associated with future deals having a positive probability of being closed and won by a user of METADATA, where such positive chance may be very high, above a given probabilistic threshold.

"Opt-in lead" is a lead that affirmatively or positively responds to marketing or advertising information. Responses from opt-in leads may also be called feedback, and may be collected through any new or conventional channels such as landing pages, social networks, emails, mailing list signups, webpage cookies, or phone calls.

"Persona" is a role held within a company or business, such as CEO, CTO, CFO. Such roles are generally well understood, with defined responsibilities with respect to a given business, and may be reached out to by METADATA for targeted marketing or advertising campaigns. For example, a B2B customer may have complex internal purchasing agents as personas. Such internal purchasing agents include, but are not limited to, CEO, CTO, CFO, marketing manager, sales director, director of product, project manager, program manager, programmer, analyst, database administrator, designer, chief architect, and software engineer. A persona describes the attributes of an individual. Distinguishing "personas" from "individuals" is important for the purpose of targeted marketing campaigns, which are tailored for specific company roles or roles within different companies. In one example, a company may have only one employee, who serves as the CEO, CTO, and CFO concurrently. In this case, there are three personas, but just one individual employee who holds all three titles.

"Profile" or "Customer Profile" comprises fields or attributes to describe a business client or a set of business clients, and includes two parts: company, and persona. Exemplary company attributes include industry, revenue, number of employees, brands, growth, etc. Persona attributes are as described above.

"Ideal Customer Profile" (ICP) contains two aspects, Company and Persona. A Company profile characterizes a client organization of interest. A Persona profile characterizes an ideal business customer in terms of a role within a potential client organization for targeted marketing campaigns. An ICP is a customer profile with attributes correlated with high probability of successfully closing and winning high-value deals, in terms of metrics, scores or weightings defined in different embodiments of the present invention.

"Lookalike" is a candidate lead obtained through comparing and matching attributes of leads from various data sources to the profile of a direct candidate lead, or a set of direct candidate leads. Lookalikes of lookalikes may be similarly generated, so that there is a hierarchy of lookalike candidate leads at different levels. Direct candidate leads and lookalikes at different levels are both targeted by marketing campaigns in the same way.

"Match rate" or "Match rate signal" is defined as a score or measure of the similarity of a lead to a given profile such as an ICP. Leads with high match rates may be considered "of high quality" and to "match" the ICP. In one example, a match rate may be computed as a percentage of number of items in a lead's profile that match an ICP; in another example, a match rate may be computed as a weighted combination of degrees of similarities between lead attributes and ICP attributes. "Demand generation" refers to the generation of high quality leads that match one or more ICPs, as defined above.

"Test target group", "target set", or "targeting set" is a subset of candidate leads selected based on certain criteria for marketing campaigns direction and targeting.

"Cost per lead" (CPL) is an advertising channel partner cost of an acquisition of a new qualified lead. A CPL is an expense that a user of the METADATA system bears for reaching the qualified leads through the advertising channel partner.

Overview

With reference to the definitions above and the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

B2B companies face the challenge of generating a predictable volume of qualified leads per unit cost spent in advertising. The present invention heightens the predictability in price and quality of leads generated from advertising by providing a closed-loop process that starts from CRM data from providers such as Salesforce and ends in form conversions, which are qualified and opt-in leads sent back to the CRM or marketing automation system, so that salespeople can then close those leads.

Broadly, embodiments of the prevent invention relate to methods and systems for generating ideal and opt-in business leads utilizing targeted advertising campaigns. More particularly, the METADATA system generates such leads by first determining one or more ideal customer profiles (ICPs) based on existing customer statistical analysis of business-to-business (B2B) clients using data from marketing automation systems of users. An ICP characterizes an ideal person within a potential client organization for targeting advertising campaigns.

From the one or more ICPs, METADATA may retrieve candidate leads, which are named companies and associated persons with contact information from a data source where such persons match the attributes of the one or more ICPs. METADATA may further generate lookalikes of existing candidate leads matching the ICPs who are not yet in the system from the databases of the present invention and third party data sources such as databases or Facebook. This process can be repeated at different levels for a large number of leads.

Having retrieved a large pool of candidate leads, METADATA may generate test targeting campaigns with advertising and landing pages directed to test target groups, which are subsets of candidate leads matching the ICPs. The system may automatically feed click-throughs from the advertising or landing pages as qualified customer leads back into the system, and may also feed transaction activities within a set period of time of the campaigns recorded in the CRM back into the system. These and other direct and indirect affirmative responses to the campaign pages indicate candidate lead interest and voluntary opt-in. Based on these responses, METADATA may perform testing on these targeting campaigns and their sub-campaigns to score the quality of various test target groups and of these campaigns. METADATA may further target other candidate leads with similar attributes to ones within test target groups from highly scored campaigns, and generate high quality candidate leads who have similar profiles as the one or more ICPs, and who have opted-in.

In one example, the only response or feedback that goes back into the user's CRM is data typed in by qualified leads during opt-in inside landing pages, and optional comments by system users on such leads. Testing can be done to ensure the quality of the leads, as well as differentiating and stratifying qualified leads into various levels of quality based on one or more scoring criteria. After performing the test advertising campaigns, one or more main advertising campaigns may be sent to the ideal business leads similar to the ones in the test target groups with high scores. Typically, test advertising campaigns are smaller than main advertising campaigns, or are targeted to smaller groups. The system may then receive responses from one or more of the ideal business leads. Finally, and the system generates ideal and opt-in business leads by selecting from the ideal business leads that responded affirmatively to the generated one or more main advertising campaigns.

Conventional and current existing sales automation systems and technologies hand over insights from the analysis of the CRM data to the user directly, and it is up to the user to execute and develop new leads. By comparison, METADATA closes the loop by targeted advertising to leads, and conversion into ideal and opt-in leads. METADATA utilizes test target campaigns including micro-campaigns to small test target groups to refine characteristics of such campaigns, and select candidate leads for further targeted campaigns according to responses or feedback from such test target groups and according to micro-criteria, which are very granular criteria such as specific companies and specific seniorities, from the CRM and other channels. Moreover, in such an embodiment, users of the system may manually adjust the results of the automatic processes as described above by specifying the types of companies and personas they wish to target and override each decision made by the system automatically. In this way, desired targeting can be achieved where the user can fine-tune the one or more ICPs. A key advantage of the METADATA system through its closed-loop architecture is its ability to produce qualified, ideal, and opt-in leads instead of just qualified contacts that may or may not affirmatively respond to marketing campaigns or advertising activities. Moreover, testing on a small subset of the lookalikes and targeting the rest based on the testing results can bring great savings in advertising costs paid to channel partners.

Lead Profiles and Attributes

FIG. 1 shows a profile attribute Venn diagram 100 illustrating relationships between an ideal customer profile (ICP) 110, direct candidate lead profile 120, and a lookalike profile 130, where the lookalike is obtained based on the direct candidate lead. An ideal customer profile (ICP) 110 is a customer profile of various attributes that characterize an ideal business customer. There may be one or more ICPs for any given advertising campaign. An ICP may be obtained by statistically analyzing and summarizing attributes of existing business leads. It provides quantitative and/or qualitative characterizations of an ideal business customer who is highly likely to positively respond to a marketing campaign. In the present disclosure, the terms marketing campaigns and advertising campaigns are used interchangeably.

Once an ICP is generated, a direct candidate lead may be obtained by comparing or matching attributes of potential leads from various data sources directly to the ICP. Such data sources many include databases internal to a METADATA system, a user's internal databases, third party databases, or the like. A lead, contact, or prospect is a prospective consumer of a product or service, and a potential or an actual existing customer of a user of METADATA. A lead may be an individual, or a company or business that an individual belongs to. A candidate lead is a lead selected for the targeting of marketing campaigns. A direct candidate lead often matches the ICP with a high match rate, as represented by the overlapping portion 115 in FIG. 1. In addition, portion 125 may represent direct candidate lead attributes that do not match those of the ICP 110. Such attributes may be original attributes, or attributes from an enrichment process, a process that retrieves more attributes from third party data sources to supplement the original attributes. Similarly, a lookalike lead 130 may be obtained from one or more direct candidate leads by comparing or matching attributes of potential leads from various data sources to the profile of a direct candidate lead such as 120, or to the profile of a set of direct candidate leads. Again, a lookalike lead may have some original attributes as well as enrichment attributes obtained from other sources and added to the profile.

In some embodiments, a direct candidate lead 120 may be an opt-in lead. An opt-in lead is a lead that affirmatively or positively responds to marketing or advertising information directly or indirectly, as explained further below. Responses from opt-in leads may also be called feedback, and may be collected through any new or conventional channels such as landing pages, social networks, emails, mailing list signups, webpage cookies, or phone calls. Similarly, a lookalike 130 based on one or more direct candidate leads may or may not opt-in to a marketing campaign. Furthermore, in various embodiments, lookalikes of lookalikes may be generated from the lookalikes based on direct leads, and may or may not opt-in. Lookalikes of other various levels may be generated in similar fashions.

As shall be discussed further herein, the METADATA system examines candidate leads including direct candidate leads and lookalikes of various levels to select, or generate, ideal and opt-in leads based on candidate leads' responses and feedback to test advertising campaigns and main advertising campaigns, and based on how well candidate leads match to one or more ICPs.

System Architecture

Figure 2:
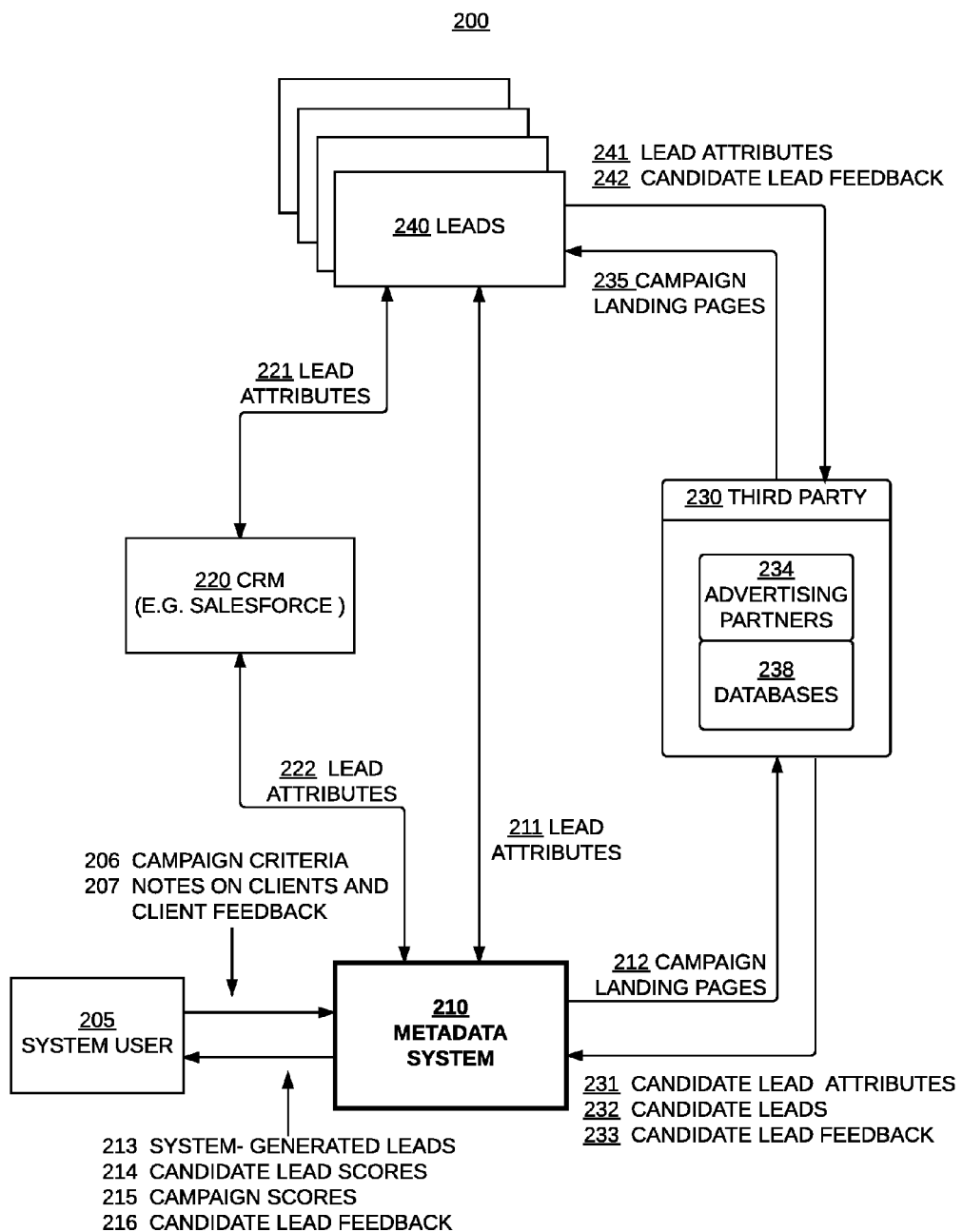
FIG. 2 is an illustrative schematic diagram showing a business lead generation framework, according to one embodiment of the invention.

FIG. 2 is an illustrative schematic diagram 200 showing a business lead generation framework, including data flow between system user 205, leads 240, METADATA system 210, CRM 220, and third party systems 230 including advertising partners 234 and databases 238, according to one embodiment of the present invention. Leads 240 refers to companies, individuals, or end user devices operated by individuals. Throughout the business lead generation process, some or all of leads 240 may become candidate leads, qualified leads, opt-in leads, ideal leads, and the like. METADATA system 210 may receive lead attributes 222 through CRM 220 about leads 240. METADATA system 210 may then check third party data sources 230 to see whether additional profile attributes 231 corresponding to leads 240 are available, and obtain more lead attributes from third party data sources 230 such as databases 238 and advertising partners 234 to enrich lead profiles for some or all of leads 240. Upon statistically analyzing these attributes, the METADATA system determines one or more ideal customer profiles ICPs, and retrieves more candidate leads 232 which match the ICPs and/or the last batch of leads 240 including candidate leads from third party sources 230. These candidate leads 232 may be lookalikes. System user 205 may define some criteria for test marketing campaigns or other marketing campaigns 206, upon which METADATA system 210 sends automatically generated campaign landing pages 212 to advertising partners 234. Advertising partners 234 then serve these pages 235 to leads 240.

In different embodiments, candidate leads 240 may indicate various levels of interest through different channels. One way is clicking on the campaign page, thereby directly submitting feedback 242 to third party advertising partners 234, which then feed these 233 back into system 210 as well. Candidate leads 240 may also respond to the campaign indirectly. An example is if a candidate lead does not click on the landing page, but orders a product or service provided by the system user directly in a new browser window. In another example, a client may not click on the landing page, but may physically leave his or her office, and drive to the airport. While the client is bored on the airplane, he or she may use in-plane Wi-Fi to buy the product upon remembering the advertisement seen earlier. A sale in such cases would be recorded in the CRM system as lead attributes 221, such as the amount of this deal, its status of being closed and won, and the time at which it went through. These lead attributes 222 may then be fed back into the system 210 by the CRM 220. Yet another situation of indirect response to a campaign is that an existing client of the system user, upon seeing the campaign page, does not click on it, but instead contacts a salesperson of the system user's organization directly to conduct business for a new transaction. Such a transaction would again be recorded in the CRM system 220, and the lead attributes 221 updated with the time, amount and status of the transaction. These client responses and lead attributes may be fed back as lead attributes 222 into system 210 by the CRM 220.

Furthermore, METADATA system 210 may analyze collected campaign results, for example, by forming a weighted score comprising candidate lead attributes 222 and 231, and candidate lead feedback 233, and follow such analysis by the return of some lead scores 214 and campaign scores 215 back to system user 205. Based on additional candidate lead feedback 216 and such scores 214 and 215, user 205 may input into system 210 some notes 207 on the leads. System 210 may then select and generate ideal business leads 213 from the candidate leads that match the ICP and who responded to the advertising campaigns, according to the scores and other information available. An ideal business lead may be a lead that matches a given profile such as an ICP with a high match rate. For example, an ideal business lead may be the CEO of an existing customer. An ideal business lead may also be a lead that matches the profile of a group of leads that have responded to an advertising campaign with a high campaign score. System-generated leads 213 may have ideal profiles and may voluntarily indicate interest to opt in, or may opt-in directly.

Figure 3:
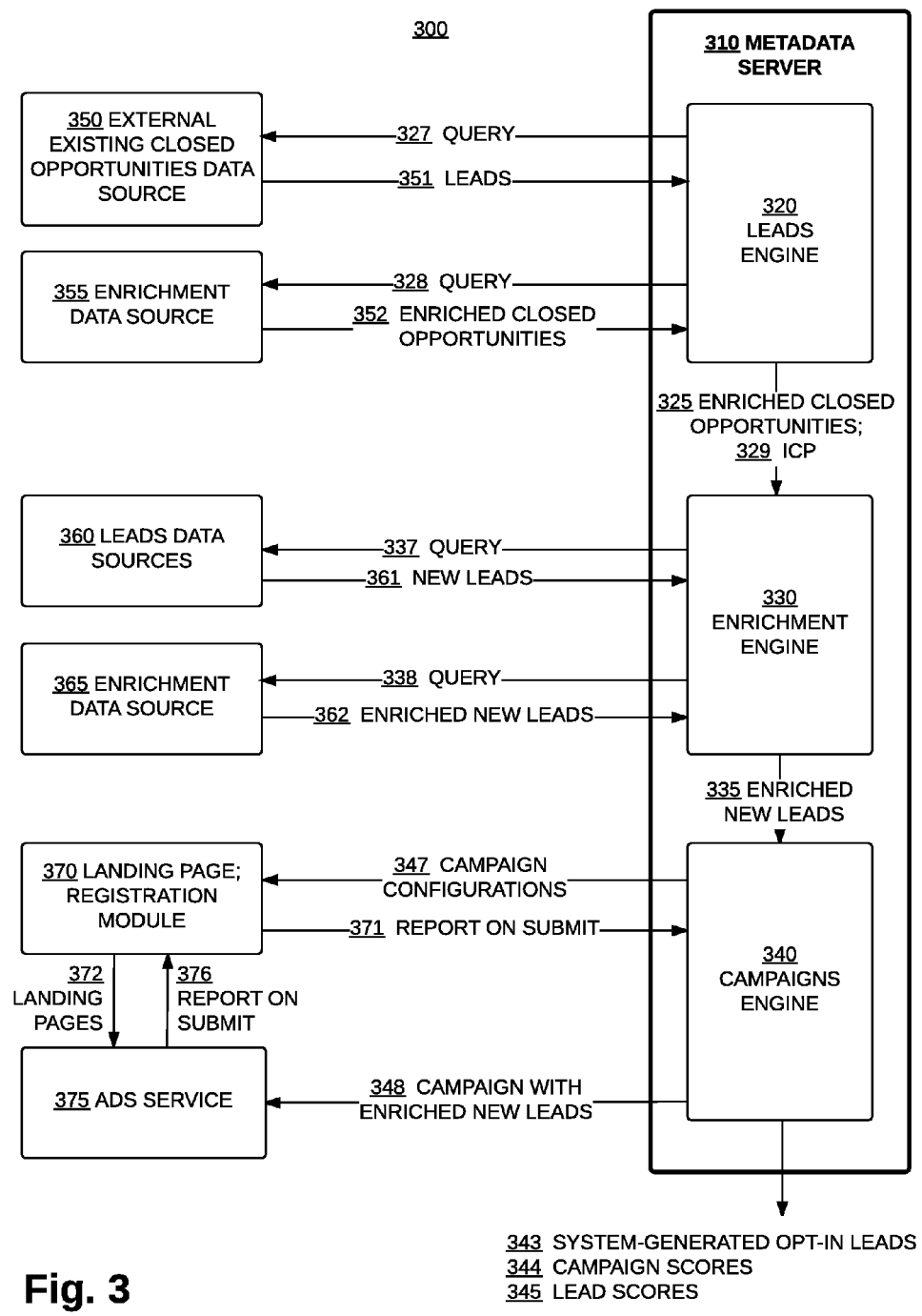
FIG. 3 is an illustrative software architecture diagram, according to one embodiment of the present invention.

FIG. 3 shows a schematic of the overall software architecture 300 of one embodiment of the present invention. The METADATA server 310 contains three main engines: a Leads Engine 320, an Enrichment Engine 330, and a Campaigns Engine 340. To generate ideal and opt-in leads, first, Leads Engine 320 sends queries 327 to an external existing closed opportunities data source 350, for example, a CRM system such as Salesforce, and obtains attributes of some original leads 351. Using some means to identify leads as primary key, Leads Engine 320 sends a query 328 to an enrichment data source 355 such as ZoomInfo, and obtains enriched closed opportunities 352. Using these attributes, the Leads Engine determines one or more ideal customer profiles (ICPs). Enriched closed opportunities 325, which are the enriched profiles of the original leads, and the one or more ICPs 329, get sent to Enrichment Engine 330 for retrieving new candidate leads. Enrichment Engine 330 sends a query 337 to leads data sources 360 to fetch new leads 361 which match the one or more ICPs 329. These new leads are the direct candidate leads, which are then enriched and retrieved as new leads 362 upon queries 338 sent to enrichment data source 365 by Enrichment Engine 330. These enriched direct candidate leads can serve again as the input to Enrichment Engine 330 to generate yet more new candidate leads 361, or lookalikes, to be enriched again. This process can be repeated in any number of iterations to generate a hierarchy of lookalikes. All generated new leads may be called candidate leads, and all of these enriched leads 335 are sent to Campaigns Engine 340. In some embodiments, Campaigns Engine 340 uploads a campaign 348 with a set of enriched new leads as target audience. In some other embodiments, Campaigns Engine uploads enriched new leads only, and ads service provider 375 targets the new leads with existing campaigns. It also sends campaign configurations 347 from the user to a landing page or registration module 370, which could be internal, or an external one like Hubspot. The landing page or registration module 370 will then upload landing pages 372 onto ads service 375, such as Facebook Ads or Google Ads, to be served to leads 335. If leads 335 directly respond to the ads, submission of their information will be reported as 376 from ads service 375 to landing page or registration module 370, and reported from the landing page or registration module 370 through 371 back to Campaigns Engine 340 for internal analytics. METADATA server 310 outputs campaign scores 344 and lead scores 345, and generates opt-in leads 343 by selecting from candidate leads 335 from Enrichment Engine 330 that match the ICP criteria 329.

Detailed Process Description

Figure 4:
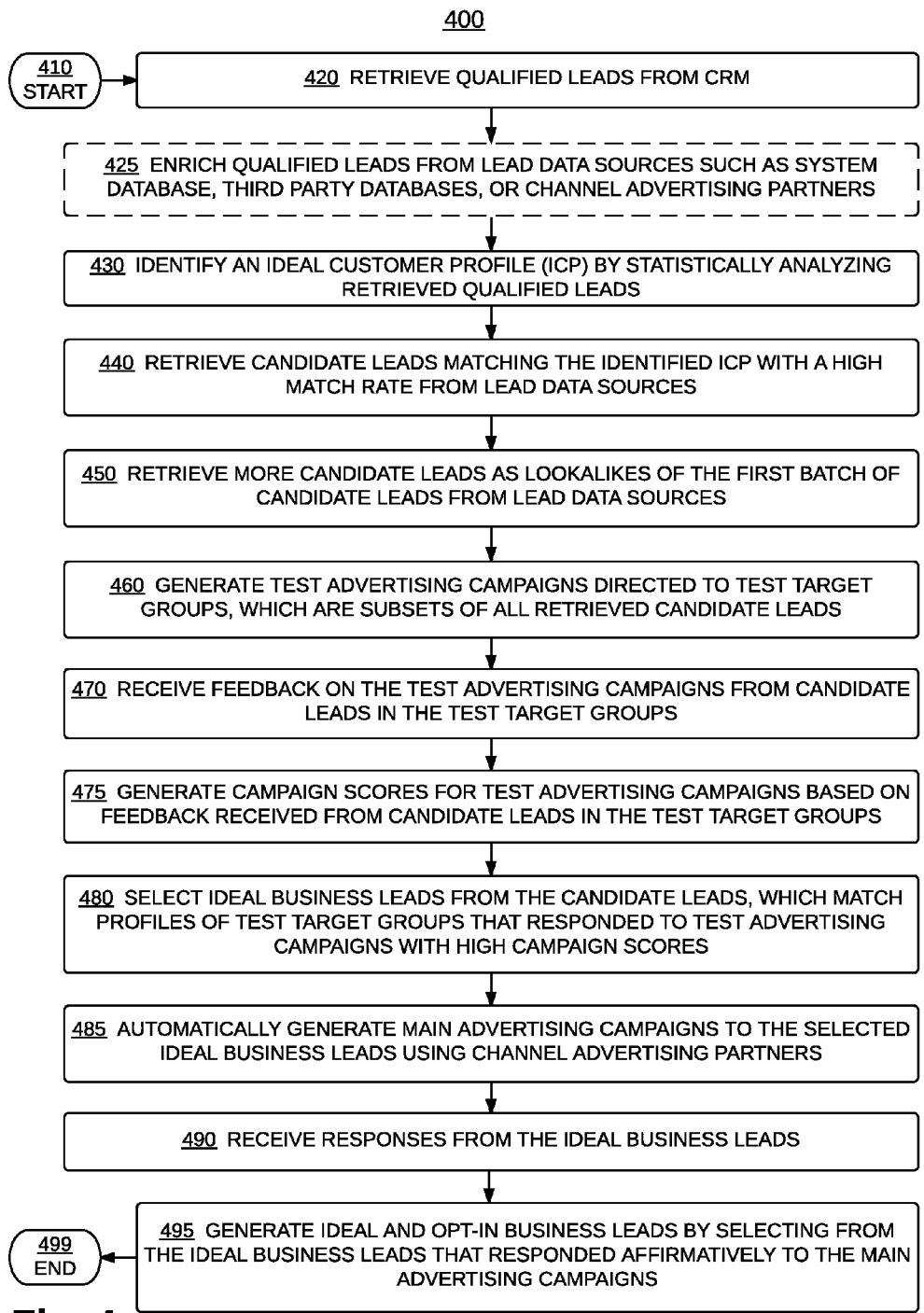
FIG. 4 is a flowchart illustrating a process for generating ideal and opt-in business leads utilizing targeted marketing campaigns, according to one embodiment of the invention.

FIG. 4 is a flowchart 400 illustrating a process for generating ideal and opt-in business leads utilizing targeted marketing campaigns, according to one embodiment of the invention. Upon initiation at step 410, the METADATA system retrieves qualified leads from a CRM at step 420, and optionally enriches the qualified leads at step 425. The system may then identify one or more ICPs by statistically analyzing the retrieved leads at step 430. The METADATA system retrieves a first batch of candidate leads that match the one or more ICPs at step 440, and may further retrieve a second batch of candidate leads, which are lookalikes of the first batch of candidate leads at step 450. Note that this could be an iterative process and there can be a hierarchy of lookalikes. Upon retrieving leads, the system generates test marketing campaigns directed to test target groups at step 460 and receives feedback on these campaigns from the different types of candidate leads at step 470. Campaign scores are generated for each test marketing campaign based on candidate leads feedback at step 475, and select ideal business leads from the first and second batches of candidate leads, which match profiles of test target groups that responded to a test advertising campaign with high campaign scores, at step 480. From here, the system automatically generates advertising campaigns to the plurality of ideal business leads using the one or more channel advertising partners at step 485, and receives responses from the ideal business leads at step 490. Finally, the system generates ideal and opt-in business leads by selecting from the plurality of ideal business leads that responded affirmatively to the generated one or more advertising campaigns at step 495. A more detailed full process of one embodiment of the invention is as follows.

Determining Ideal Customer Profiles

In a first step, a METADATA system may first connect to a user's CRM account such as under Salesforce.com and "reverse engineer" past customers' data to identify one or more ideal customer profiles (ICPs). This step is part of the work by Leads Engine 320.

Figure 5:
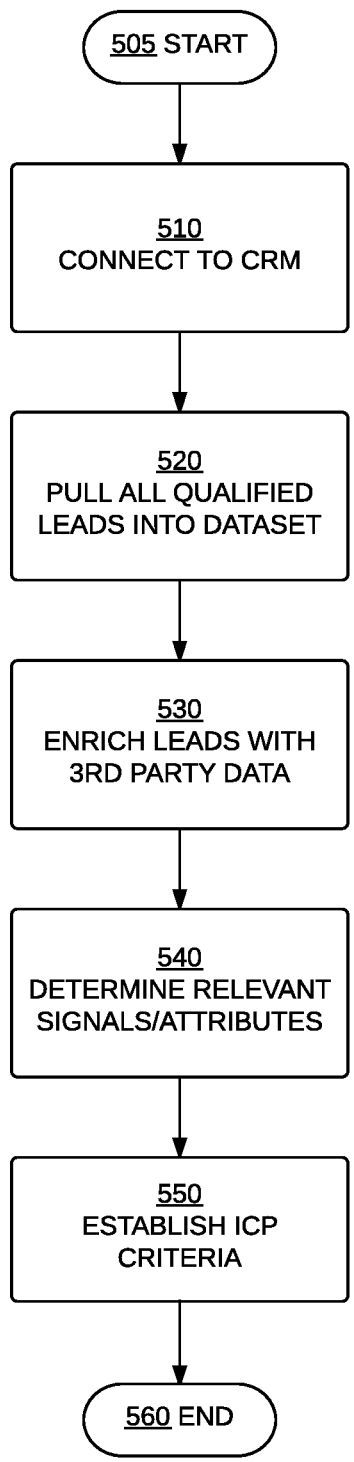
FIG. 5 is a flowchart for establishing ICP criteria for a Leads Engine of one embodiment of the invention.

FIG. 5 is a flowchart 500 depicting the ICP determination process by Leads Engine 320, according to one embodiment of the present invention. Upon initiation of the process at step 505, Leads Engine 320 connects to a CRM database at step 510, and pulls out all qualified leads into a dataset at step 520. Leads engine 320 then enriches the leads with third party data at step 530, and determines relevant signals or attributes at step 540, before establishing ICP criteria from these attributes at step 550.

More specifically, in one embodiment, a METADATA system may run an internal report within the CRM that identifies all the leads and contacts that are qualified. A qualified lead is a lead associated with deals with a high probability of being closed and won by a METADATA user. In some embodiments, a qualified lead is one for which associated opportunity value is greater than 0. In one embodiment, a lead is considered to be qualified as long as there is a potential future opportunity with Amount >$0, even if any past opportunity for the lead was closed and lost. The opportunity amount can be understood by some simple examples. Suppose that a contact in the CRM system is a student who went to the seminar of the user in search of internship opportunities. Such a student contact would have an opportunity amount of $0, because there is no intention of any business transaction in the foreseeable future. Another example might be a past customer who had a closed and won deal worth $1 M. The opportunity amount would then be $1 M, since this past customer may do business with the system user again in the future. Moreover, a past customer with a deal worth $50 k that was closed and lost, may still be a future customer, and so the opportunity amount would be $50 k. Therefore, in such an embodiment, the amount would be greater than zero in most cases. In another embodiment, the student in the aforementioned example may be considered to have a small non-zero opportunity amount automatically in three years, because assuming he or she has graduated, he or she may be in a position to make decisions for his or her firm, and demand business service from the system user. Yet other embodiments may define the opportunity amount differently. For example, the pseudo SQL query below may retrieve from a database all leads associated with positive opportunities:

PSEUDO QUERY: SELECT * FROM LEADS_TABLE
 INNER JOIN OPPORTUNITIES_TABLE
  WHERE OPPORTUNITIES_TABLE.AMOUNT>0

The METADATA system may then pair the returned data table with third party data to identify as many attributes as possible about the leads and the companies they work for. Some exemplary third party data sources include paid data sources such as ZoomInfo, and freely available ones such as the public web. The process of supplementing known lead profiles with additional attributes is called lead enrichment, as explained above and with reference to FIG. 3. An example of an enriched lead profile is shown in Table 1 below.

TABLE 1

Example table for lead attributes

| | |
|---|---|
| Email | gil@metadata.io |
| Job Title | CEO |
| Company | Metadata |
| Domain | Metadata.io |
| Industry | Computer Software |
| Groups | Marketing, B2B, Entrepreneurship |
| Skills | Programming, Artificial Intelligence, Robotics, Marketing, Growth |
| Technologies | ASP.NET, C#, C++, SQL, Pixel, Facebook, Optimizely, WordPress, Cloudera, CDH, ElasticSearch |
| Revenue | $1,128,500 |
| #Employees | 10 |
| Married | TRUE |
| Gender | Male |
| Income | $100,000 |
| Country | United States |

TABLE 1-continued

Example table for lead attributes

| | |
|---|---|
| State | CA |
| Seniority | Executive |
| "Social Clout" | High |
| Hours Active | 9 pm-3 am |
| Opportunity Amount $ | $35,000 |
| Opportunity Status | CLOSED WON |
| Brands | Fox, Amazon, IKEA |
| Ethnicity | Middle Eastern |
| Professional Connections | 5.294 |
| Education | B.Sc. Comp. Sci. (2) MBA |
| Professional Experience | (0) Metadata.io (1) Qubole (2) Karmasphere (3) TIBCO Spotfire (4) SAP (5) Matrix IT (6) Unitronics (7) IDF |
| CEO Ranking (Glassdoor-public web) | 3.6 |
| Alexa Ranking | 4,249,123 |
| Visitors per month | 8,420 |
| Growth MoM | 25% |
| Other Keys | (Facebook) (LinkedIn) (Twitter) (website) (IP Address) (other emails) |

The METADATA system may then analyze the augmented dataset to generate insights on the assembled data. For example, in one embodiment, different groups or clusters within the dataset may be determined by running statistical functions such as KMeans. In another embodiment, the system identifies signals that correlate most to opportunity.amount AND opportunity.status=won, by running statistical functions such as decision tree analysis, regression analysis, or random forest. Boolean variables may be used to indicate whether a customer prospect became a real customer in one embodiment. Such prospects may in another embodiment be labeled with a probability value instead of a Boolean. Lead scores or weightings may be further applied based on such variables as opportunity amounts, and opportunity status, where opportunity status may include closed and won, closed and lost, etc. In some embodiments, the statistical analysis is based on machine learning of profile attributes of leads with high lead scores, and profile attributes of leads in the test target groups corresponding to high campaign scores.

Next, METADATA builds a map of the identified clusters that represent different "personas" that are involved in a buying process. A persona is part of an ICP. Per each persona, METADATA may identify different criteria necessary to target prospects who fit that persona in different advertising networks.

Figure 6:
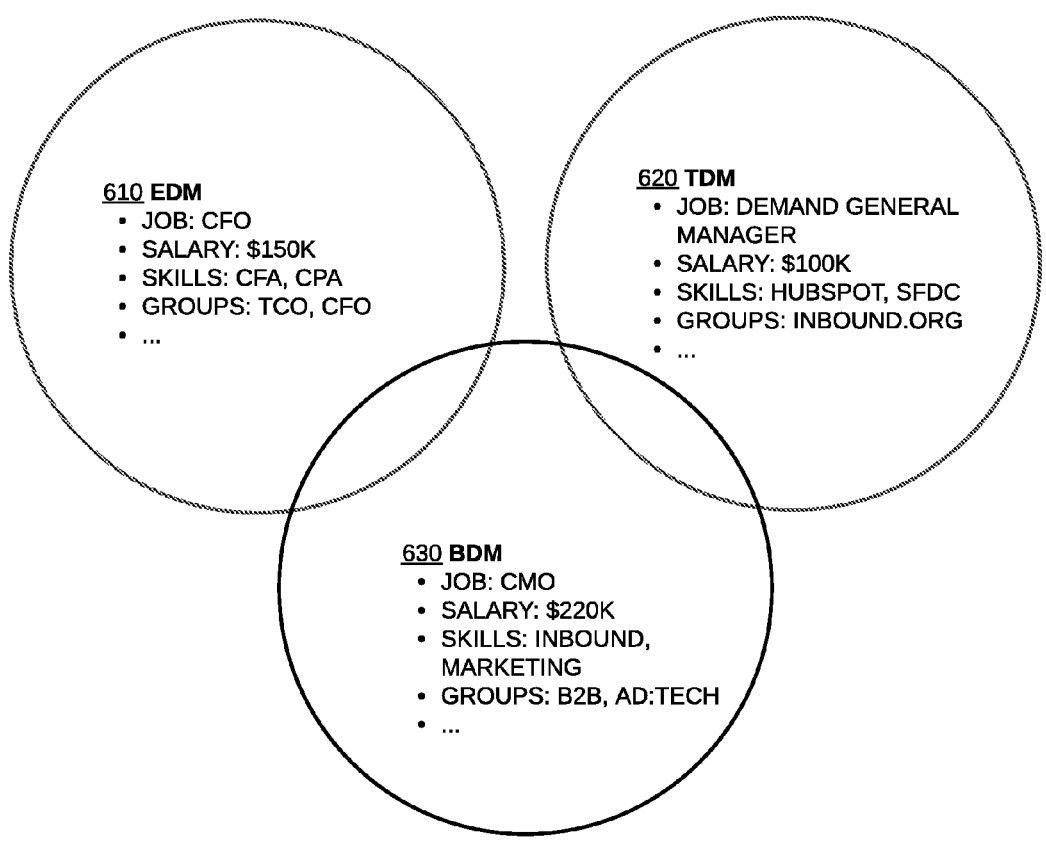
FIG. 6 is a diagram showing an example of leads embodying different personas involved in a buying decision, according to one embodiments of the present invention.
Figure 10:
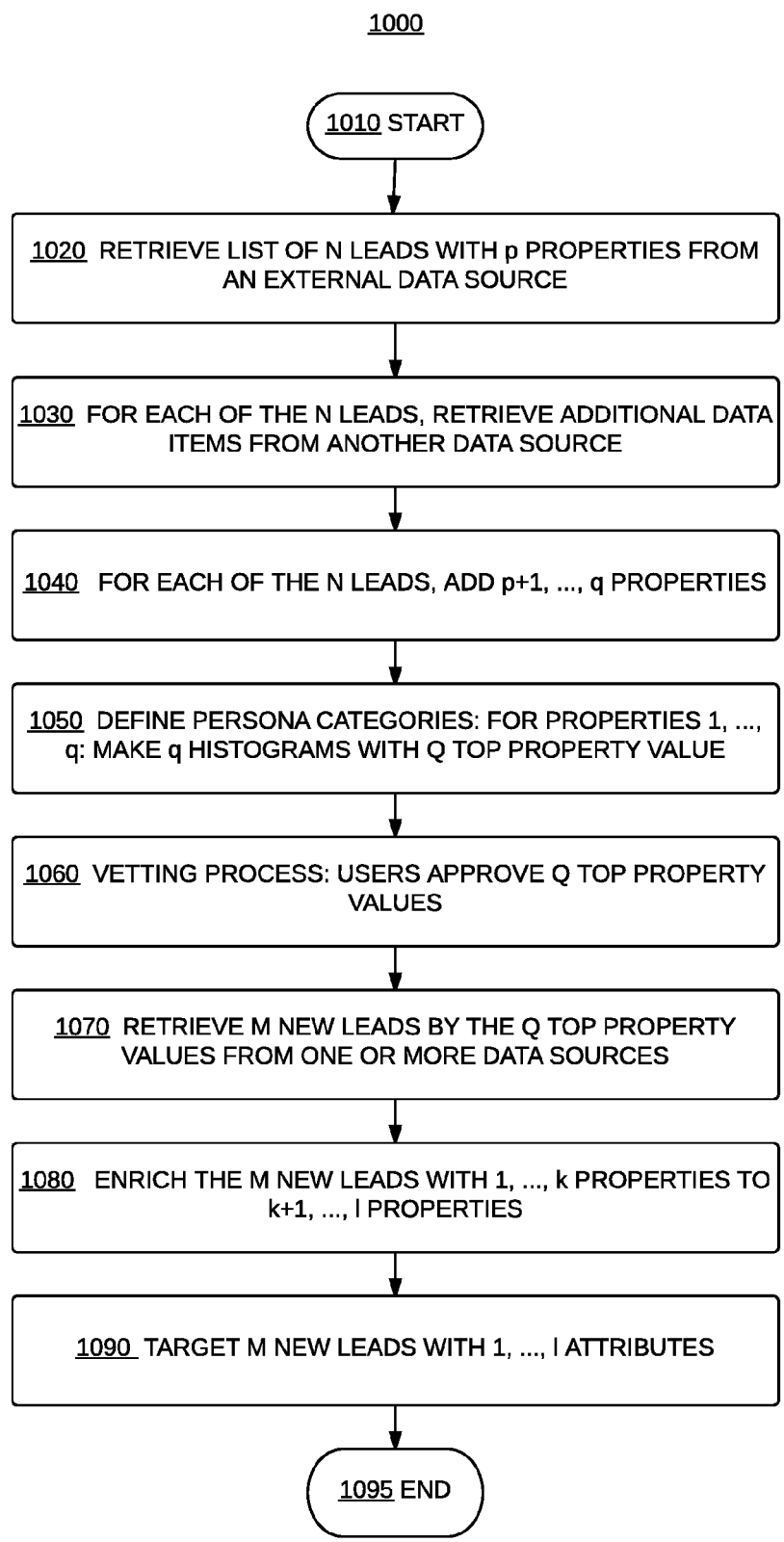
FIG. 10 is a flowchart showing the iterative process of enriching leads for lead generation in an Enrichment Engine for one embodiment of the invention.

FIG. 6 is an diagram 600 illustrating how different personas may be represented and related. Here, METADATA identifies three separate personas that each represents a different entity involved in buying decisions: an Economic Decision Maker (EDM) 610, a Technical Decision Maker (TDM) 620, and a Business Decision Maker (BDM) 630. Overlaps of the circles represent shared attributes between personas. Any buying decision may involve one, or two, or all personas. In this example, one buying decision may involve BDM 630 and EDM 610, and another buying decision may involve BDM 630 and TDM 620. In one embodiment, the system asks the user to approve one or more personas in a vetting process as illustrated by FIG. 10 below.

In one embodiment, once a map of personas is built, the METADATA system may prompt the user to label each persona with a friendly name such as EDM or TDM for later use.

Setting Up and Deploying Test Marketing Campaigns to Candidate Leads

Once ICPs including personas are generated or identified, large samples of prospective customers may be collected for marketing campaign targeting. Such prospective customers, or "candidate leads", may include direct candidates leads, and lookalikes at various levels. In the present disclosure, the terms marketing campaigns and advertising campaigns are used interchangeably.

Figure 7:
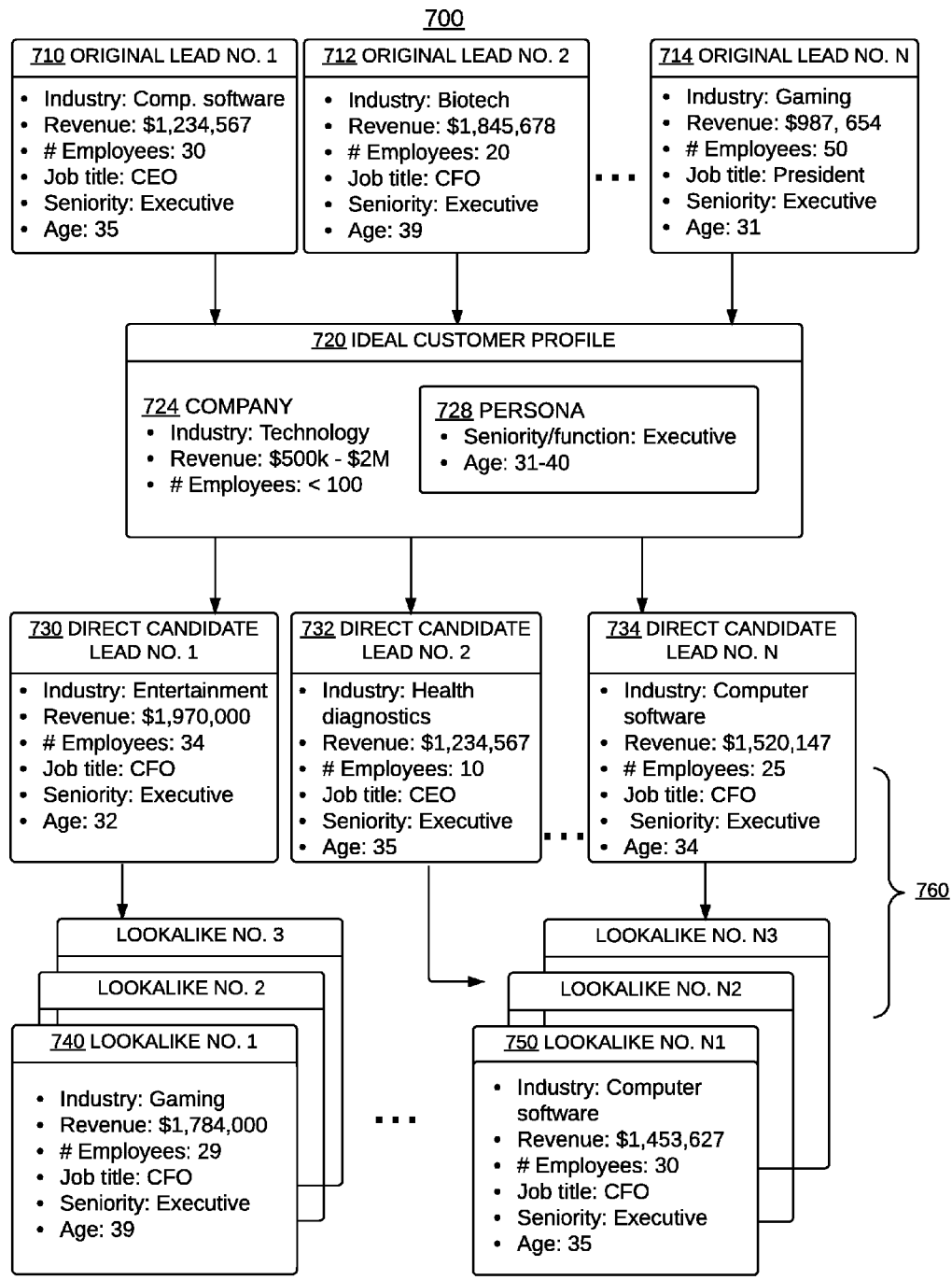
FIG. 7 is an illustrative example showing the generation of ICP, direct candidate leads, and lookalikes in one embodiment of the invention.

To understand on a high level how all these are generated and related, one may refer to FIG. 7 as a schematic diagram 700 showing the lead generation process, according to one embodiment, of the invention. In particular, FIG. 7 illustrates the generation of ICP 720 from original leads 710, 712, and 714, the generation of direct candidate leads 730, 732, and 734 from ICP 720, the generation of lookalikes 740 from direct candidate lead 730, and the generation of lookalikes 750 from direct candidate leads 732 and 734. In some embodiments, Leads Engine 320 may analyze attributes of the original leads 710, 712, and 724, and generate an ICP 720 with a company profile 724 and persona profile 728. In this example, all original leads 710, 712 and 714 have roles in companies in the technology sector and with revenues in the range $500 k-$2 M. These attributes are shown in the company profile 724 of the ICP 720. Moreover, original leads 710, 712, and 714 are all in executive positions and are between ages 31 and 40; such attributes show up in persona profile 728 of ICP 720. The Leads Engine thus comes up with ICP 720 with attributes as shown. From ICP 720, Leads Engine 320 retrieves direct candidate leads 730, 732 and 734 by matching for ICP attributes 720 from internal and third party data sources, and retrieves lookalikes 740 and 750 by matching for attributes of the direct candidates leads 730, 732 and 734 in a similar way. Note that FIG. 7 shows only one level of lookalike generation, but this is in general an iterative process. In this figure, candidate leads 760 selected by the METADATA system for targeting include direct candidate leads 730, 732, and 734, and lookalikes 740 and 750. Some of these candidate leads 760 may have good match rate signals to the ICP and may opt in. Moreover, in various other embodiments, multiple ICPs and personas may exist. The user could also specify different criteria of different levels of granularity.

Once ICPs and candidate leads are identified, the METADATA system may allow a user to start promoting a certain test marketing campaign to a test target group, which is a subset of candidate leads fulfilling certain criteria. For example, a test target group may have a target persona that resonates with that campaign content.

Figure 8:
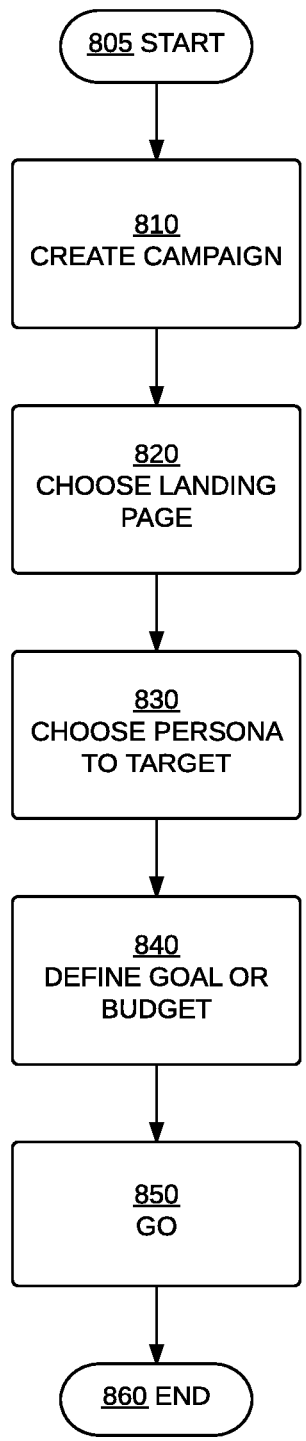
FIG. 8 is a diagram of a campaign flow in a Campaigns Engine, showing an illustrative process for bringing lookalike leads from an existing data source, according to one embodiments of the present invention.

FIG. 8 shows a flowchart 800 of the work of a Campaigns Engine for promoting a marketing campaign to a given persona in one embodiment of the invention, and the steps are behind what goes on in FIG. 9A, to be described below. Upon initiation at step 805, one or more campaigns are created in step 810. A user chooses a landing page at step 820, and chooses the persona to target at step 830. Then, the user optionally defines a visit-to-submission percentage goal, some other goal, or a budget at step 840. Now, the campaign is ready to go out at step 850 and can be uploaded to ads servers to be served to candidate leads.

Figure 9A:
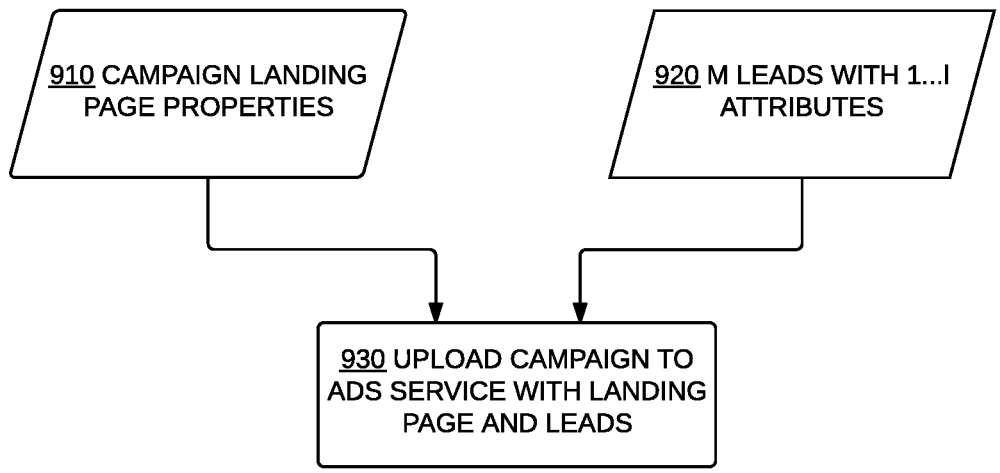
FIG. 9A and FIG. 9B are flowcharts showing steps for promoting a marketing campaign to given persona for one embodiment of the invention.
Figure 9B:
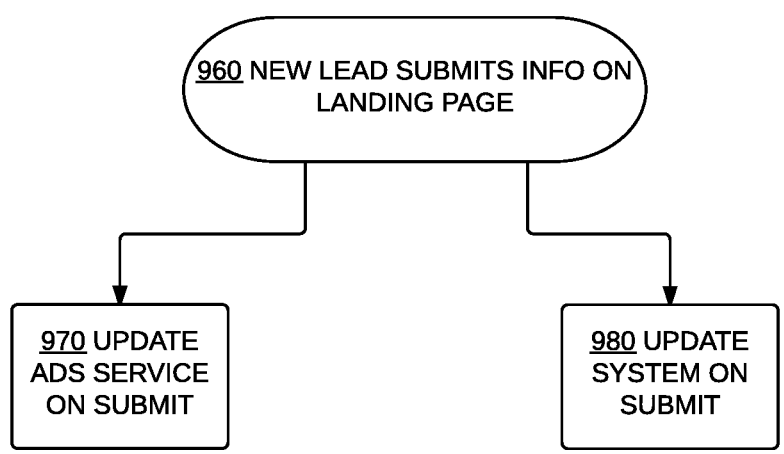

FIG. 9A and FIG. 9B depict the two parts 900 and 950 of a campaign setup flow, according to one embodiment of the present invention. In FIG. 9A, a Campaigns Engine, such as Campaigns Engine 340 shown in FIG. 3, follows the flow in FIG. 8, takes campaign landing page property inputs 910 and candidate leads 920 with a number of specified attributes, and uploads the campaign with these landing page and leads to an ads service 930. FIG. 9B shows what happens after the ad is served to a lead. When a new lead submits information on the landing page at step 960, the Campaigns Engine updates the ads service at step 970 and also updates the system at step 980 upon a clicking of a submission button. These figures together illustrate the work of the Campaigns Engine. Note that FIG. 8, FIG. 9A, and FIG. 9B are all applicable for both test campaigns or main campaigns. A more detailed process is as follows.

The system prompts the user to choose among the campaign's landing pages to determine where to redirect new clicks for this campaign. The system connects to marketing automation to pull campaigns they are running now, and matches the campaign type to appropriate persona profiles being targeted, for example, technical campaigns for CTOs and financial campaigns for CFOs. One may recall the example in FIG. 6 for a visualization of this idea. The system installs code snippets on both the landing page and the associated 'thank you' page, using means including but not limited to the following: enrichment JavaScript, UTM and other tracking codes, advertising channels' conversion tracking, and retargeting pixel. The system then tries to estimate the visit-to-form-submission conversion percentage, or prompt the user to set a value for it.

The system prompts the user for the total budget (e.g. $1,500) or number-of-conversions goal (e.g., 300 webinar signups), for the campaign and the date spectrum (e.g., Jul. 1, 2016-Aug. 1, 2016), or any other criteria. These can be used to calculate a score for the campaign. This campaign scoring will be discussed in further detail.

The system then starts querying its internal and third party data sources based on parameters they support for prospects who fit the selected personas of ICPs, taking advantage of the fact that each API has different filters. These contacts are the direct candidate leads, as described above in FIG. 1 and FIG. 7. The system downloads these direct candidate leads into the user's account. Solutions in the prior art generate their lookalikes based on their internal channel information. The current invention, in contrast, since it connects to many other data sources, uses a much larger number of attributes to generate lookalikes. Moreover, rather than just having channels generate lookalikes, the system generates lookalikes as well, and then does A/B testing or other kinds of testing between the target sets generated internally versus those generated by the channels.

FIG. 10 shows a process 1000 of generating lookalikes in an Enrichment Engine in one embodiment of the invention, as an iterative process described in the five paragraphs starting with the current one. Upon starting at step 1010, the system retrieves a list of N candidate leads with p properties from an external data source at step 1020, where the data source may be, for example, Salesforce, or simply a csv file. These candidate leads may be the direct candidates explained in FIG. 1 with reference to attributes 115 of a system-generated direct candidate lead, or in FIG. 7 with reference to direct candidate leads 730, 732, and 734, or any subsequent level of lookalikes 740 or 750. Then for each of these candidate leads, the system retrieves additional data items from another data source at step 1030, and enriches each lead with properties from the (p+1)-th to the q-th at step 1040. At this point, the Enrichment Engine defines persona categories for these initial N candidate leads using all q lead attributes, and makes q histograms with Q top property values, using statistical methods or machine learning techniques at step 1050. Next comes a vetting process in which the users approve the Q values/attributes that were just put forward, at step 1060. After that, the Enrichment Engine fetches M new leads by the Q values/attributes from a data source at step 1070; these are lookalikes of the initial N candidate leads. It then enriches the M lookalike leads with specific values of an initial number of attributes, k, as well as the (k+1)-th through 1-th attributes from other data sources at step 1080. Finally, these M candidate leads with their 1 attributes are ready to be targeted at step 1090. The process of how all these different personalities are generated can be reviewed in the illustrative summary in FIG. 7, and a more detailed description of the process 1000 is as follows:

The system enriches the lookalike prospects with additional attributes to determine the match rate signal, defined as a measure of the similarity of the lead to a given ICP. For example, the match rate signal could be provided in some embodiments by a percentage of number of items in the lead's profiles that match the ICP, and in another embodiment, by a discrete or continuous weighted combination of degrees of similarities between lead attributes and the ICP attributes, that describes whether or not the lead is a good match.

After obtaining these lookalike prospects, the system can enrich the data again using the lookalike primary keys, obtain additional information on the lookalikes from available datasets, and compare these enriched lookalikes to the criteria in the ICP. Table 2 shows some examples of types of data available in third party data sources.

TABLE 2

Example data types available in third party data sources

| | | |
|---|---|---|
| ZOOMINFO OR | Email | manuel@outreach.io |
| CLEARBIT OR | Job Title | CEO |
| LEADFERRET | Company | Outreach.io |
| | Domain | outreach.io |
| | Industry | Computer Software |
| | Seniority | Executive |
| | Country | United States |
| | State | WA |
| | City | Seattle |
| | LinkedIn | 10 |
| HG DATA | Back End | Mongo DB, RDS, |
| (sample type | Technologies | MySQL |
| of paid | #Employees | 23 |
| data source) | Revenue | 2,390,000 |
| PIPL (another | Groups | Entrepreneurs, Startups, |
| sample | | Sales SaaS |
| data source) | Skills | Marketing, Growth, |
| | | Sales, Entrepreneurship |
| | Alexa Ranking | 2,410,222 |
| | Income | 140,000 |

As an example, the system may count how many lookalike candidate leads with, for instance, a match rate over 0.8 or a probability chance of closing future deals of over 70%, have been generated, and repeat the process to obtain more leads if necessary until a satisfactory amount has been generated to support the goals of the campaign. For example, if 1,000 conversions are required on a 10% visit-to-form-submission, then approximately 10,000 lookalike prospects are required. The quality of each candidate lead, no matter direct or lookalike, with respect to the mean, is also evaluated.

If not enough leads are generated with the specified level of a metric such as match rate or probability chance, the user can choose to lower the required level of such metric to increase volume, or simply target more lookalikes by generating higher-level lookalikes iteratively based on the advertising networks' own capabilities. For example, the system may upload 1,000 best contacts of candidate leads to Facebook, and generate a 2 million lookalike audience based on these best contacts. In this way, from 1,000 best existing matches to the ICP, we generate 2 million people from Facebook that have "lookalike" profiles to the existing candidate lead profiles previously obtained from ICP. This process can alternatively be done in the system internally, in other media channel partners, or even in the clients' own lookalike generation system, if available. In iterating the processes in the preceding four paragraphs and the current paragraph, many lookalikes of candidate leads may be generated.

Once this two million lookalike audience is obtained, a campaign may be set up, where the campaign is made up of dozens, hundreds, thousands, or millions, of sub-campaigns, which may be very small micro-campaigns, in different trials. That is, each campaign may target a different test target set, for example, a subset of the direct leads, lookalikes generated internally, lookalikes generated by channels, lookalikes of lookalikes, or a subset based on other micro-criteria. For each target group, the highest conversion rate may be the only criteria for success. The ads are then targeted to those 2 million people across all social media networks.

Now, the system may upload the lookalike audience to the different advertising networks based on hashed keys such as email, Twitter handle, Facebook handle, IP address, and cookie, to hyper-target that audience across these networks.

The system can at this point set up test marketing campaigns at different levels of hierarchy across multiple channels against those audiences. The system directs campaigns to selected landing pages, and prompts the user to provide feedback on the candidate leads and the test target groups for each campaign via email or the Campaign Leads page, which shows to the user the candidate leads that each campaign attracted, i.e., the lists of candidate who opted-in. Visit-to-form-submission conversions are generated, and the user's CRMs provide information on whether the lead is closed or not, and details about bookings such as booking amount, time to booking, opportunity (before booking happens), opportunity amount, opportunity chance (e.g., probability that the opportunity will be closed and won), and lead scoring provided by marketing automation software. The salesperson of the user organization can provide manual feedback of leads and mark whether they are qualified in an embodiment. Furthermore, the system can define a candidate lead voluntary opt-in weight as a numerical value between 0 and 1, which scores the level of interest according to feedback of a candidate lead to a campaign, which is non-zero for an opt-in candidate lead, defined as one who clicks on the landing page or one who otherwise responds to a campaign positively within some specified time based on CRM data. This weight is continuous and depends on the level of interest indicated in the feedback provided, updated attributes of opportunity amount and status, such as closed and won, and salesperson input as referred to above. The score of a given campaign trial is based on a tuple of numerical values that can be weighted for comparison with a single threshold or directly compared to multiple thresholds. The tuple may contain but is not limited to the following elements: visit-to-form-submission conversion percentage, total budget, advertising cost per lead (CPL), match rate signal, candidate lead voluntary opt-in weight, booking amount, time to booking, opportunity (before booking happens), opportunity amount, opportunity chance (probability that the opportunity will be closed and won), and marketing automation (CRM) software internal lead scoring. All of factors discussed above can be weighted to form a score of any particular campaign.

Based on the feedback of Salesforce opportunity.created=true and Salesforce opportunity.amount (e.g. $10,000), the system scores a given campaign combination/trial (e.g., Facebook, Custom AudienceA, Landing Page B), and increases the budget or eliminates the experiment based on a weighted opportunity value from the feedback received via the Salesforce or other CRM systems.

Testing the Campaigns

The system may repeat the process of ICP determination and Test Marketing Campaign Generation, and further optimize the cost per lead (CPL) by testing the campaign offer using A/B testing, indirect testing, probabilistic testing, and comparative testing. In one embodiment, the system A/B tests the campaign offers and advertising channels to see which micro-campaign has a better response. In another embodiment, for example, the system can compare the response to campaigns sent to target groups generated by the system and those sent to target groups generated by the advertising channels. By doing so, one can select target groups with the minimum CPL with the highest quality leads. Similar comparisons can be performed on target groups formed by different criteria. In this way, we can not only score the quality of our target groups, but also determine what campaign strategies are optimal for which groups. In another embodiment, we can perform comparative testing, where we serve more than one target groups with a given landing page, and score the campaign trials based on candidate lead voluntary opt-in weights. Another comparative test would be to compare target groups or campaigns based on a weighted score formed from the match rate signals of the candidate leads within a target group and their voluntary opt-in weights after obtaining campaign feedback. The specifics of the scoring are not limited to our invention and are shown as examples of embodiments. Testing on a small subset of the lookalikes and targeting the rest based on the testing results can bring great savings in advertising costs paid to channel partners, and allow for the specific targeting of micro-criteria and fine-tuning the generation of high quality leads.

Generating Ideal and Opt-in Business Leads from Main Campaigns

After performing the test advertising campaigns, one or more main advertising campaigns may be sent to the ideal business leads similar to the ones in the test target groups with high scores. Typically, test advertising campaigns are smaller than main advertising campaigns, or are targeted to smaller groups. The system may then receive responses from one or more of the ideal business leads. Finally, and the system generates ideal and opt-in business leads by selecting from the ideal business leads that responded affirmatively to the generated one or more main advertising campaigns.

Example Test Marketing Campaign Process

Below is an exemplary process of the METADATA system in one embodiment of the invention. First of all, the system obtains attributes for our contacts & companies enrichments from the following data sources. First of all, three different stand-alone wizards do the following: connect METADATA to third party platforms, for example, for obtaining data and other purposes, create one or more new targeting sets (once or more than once, since the definition can be adjusted in the process), and create a new test marketing campaign.

Connecting to Third Party Platforms

Third party platforms include Facebook, Google AdWords, Salesforce, and Hubspot. These can serve as data sources and for other purposes. Other data sources include but are not limited to the following. The bracketed items below indicate the types of data obtained from the corresponding data source.

1) LinkedIn (Contacts)
2) FullContact (Contacts+Companies)
3) ClearBit (Contacts+Companies+Lookalikes)
4) Pipl (Contacts)
5) ZoomInfo (Lookalikes)
6) BuiltWith (Companies)
7) LeadSift (1)
8) WhitePages (Contacts)
9) GlassDoor (Companies)
10) HG-Data (Companies)
11) LeadFerret (Lookalikes)

Defining Targeting Sets

FIG. 11 is an illustrative campaign targeting set setup 1100 for one embodiment of the invention. The user defines a target set, which specifies the audience he wishes to target. This is done by defining company targeting and persona targeting. The company targeting attributes 1120 can be set, for example, revenue values of $1 M, $5 M, $25 M, $50 M, 100 M, $250 M, $500 M, $1 B, or another value. Contacts matching other generic properties can be obtained from LeadFerret, for example; the Technology or Industry from HG-Data; and Domain List from LeadFerret or Clearbit. Then, persona targeting 1130 can be done by specifying properties such as seniority. After obtaining these candidate leads, lookalikes candidate leads can be generated in the next step, and the user should be able to define more than one targeting set, for example, by narrowing the attributes further and obtaining groups satisfying certain micro-criteria.

The system then shows how the user the Salesforce analysis of the targeting sets he defined and asks him to approve or go back and change the targeting sets.

In a last validation step, the system shows the user five contacts that match each targeting sets that they defined in the earlier steps, and asks the user to validate that these are the personas the user would like to target. If the user does not validate, send him/her to change the targeting set.

Creating a New Campaign

Figure 12:
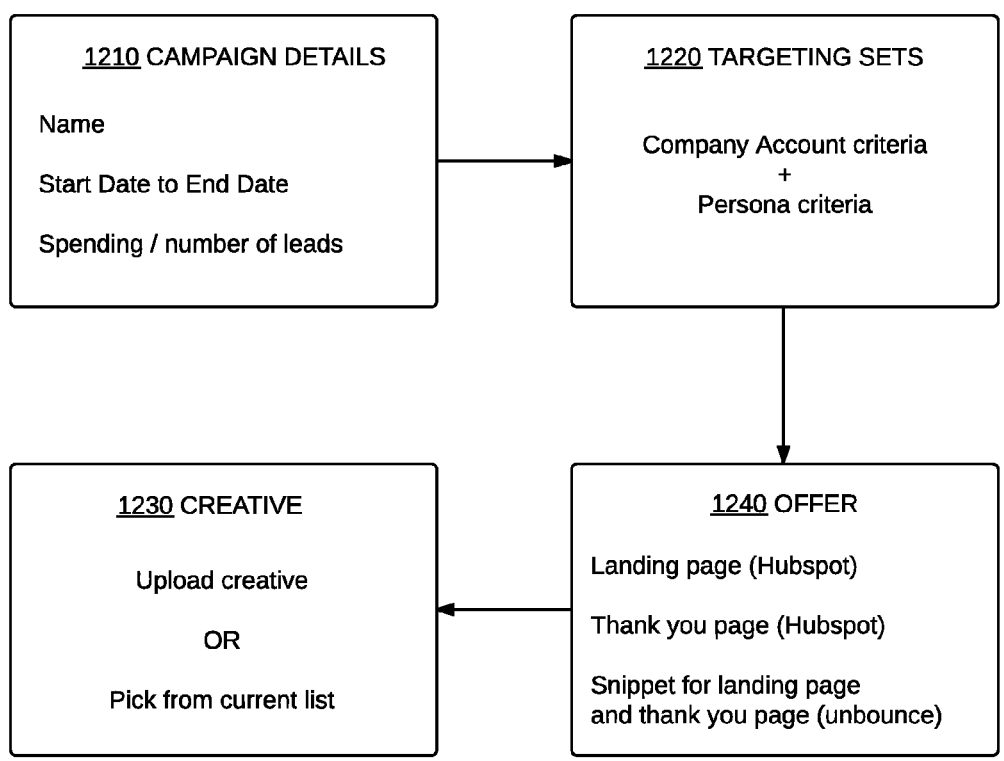
FIG. 12 is an illustrative campaign flow for one embodiment of the invention.

FIG. 12 shows an illustrative campaign flow 1200 by means of a campaign creation wizard, which helps the user to define new ad campaigns for one embodiment of the invention.

The METADATA platform may consist of the following types of pages:

1) Dashboard such as Campaign details page 1210
2) Targeting Sets page 1220
3) Campaigns pages such as Offer page 1240 and Creative page 1230. An exemplary Campaign Setup page is FIG. 13.
4) Campaign Leads page 1410

The first three kinds of pages above are for creating a campaign. In one embodiment, the Dashboard Page should show important Key Performance Indicators (KPIs), for example, the average cost per clicks for currently existing campaigns not run by the system, or the average cost per click for campaigns that the system runs. Another important KPI may be the display and/or comparison of quantitative measures along the campaign chain, including Spend, Impressions, Clicks, Conversions, and Dollar Opportunity.

The Targeting Sets page 1220 shows the target sets defined by the user, which is divided into two parts or two types: Company targeting sets containing company account criteria, and persona targeting sets containing persona criteria, as already illustrated in FIG. 11. The user should have the ability to add and remove target sets. The process of setting up a target set has two life cycle phases: In Process, and Done.

The Campaign Setup page shows statistics for the campaigns we run. This page is also where the user can run and stop the campaigns. FIG. 13 shows an illustrative example test Campaign Setup 1300 in Facebook for one embodiment of the invention. The exemplary test campaign form 1310 contains campaign fields 1320 for, for example, duration and budget information, targeting fields 1330 for, for example, targeting sets and choices of landing pages, some creative fields 1340 for, for example, ad headlines, as well as ad creative fields 1350 for uploading additional files for the visuals, for example. Note that this is an illustrative example not meant to be restrictive in the kinds of information that can be specified on a test Campaign Setup page.

Figure 14:
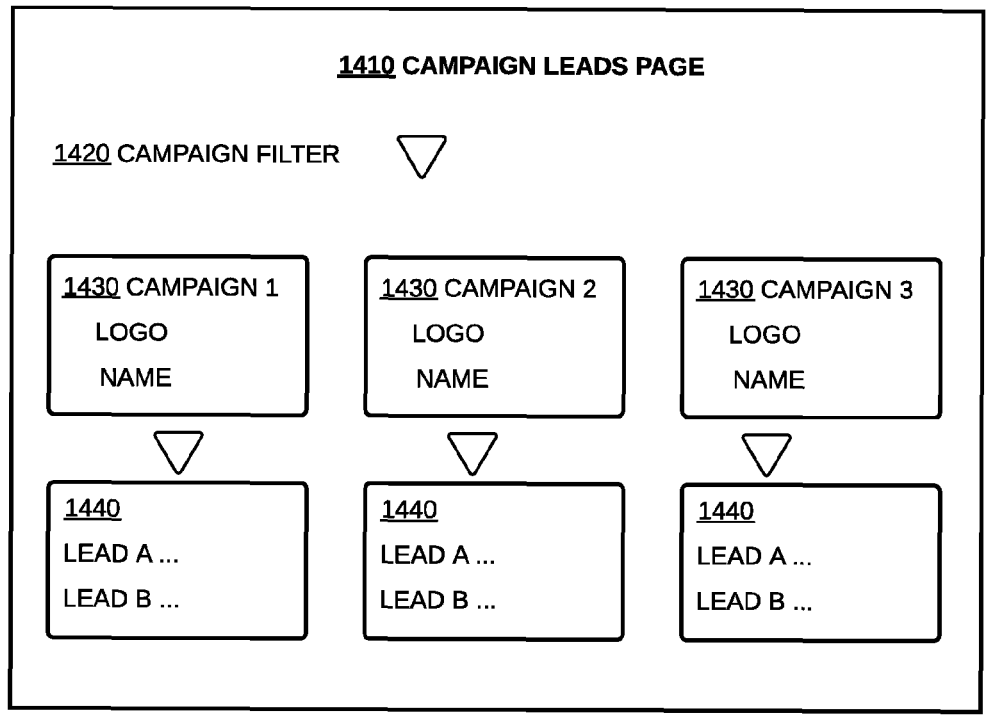
FIG. 14 is an illustrative Campaign Leads page in one embodiment of the invention.

FIG. 14 illustrates the Campaign Leads page 1410 in a sample webpage 1400 in one embodiment, which shows to the user the candidate leads that each campaign attracted, i.e., the lists of candidate who opted-in. The campaign filter 1420 allows the user to choose which campaigns 1430 to view, and the corresponding leads who have opted in 1440 are shown accordingly.

Illustrative Case Study: Concurrent

To demonstrate the effectiveness of methods and system as disclosed herein, a case study is presented next.

Concurrent, a business in Big Data application infrastructure, wanted to deliver their live product demo to clients in a target list of companies, including accounts that may be been overlooked before, as well as new targets ready to engage with sales. The ultimate goal is to accelerate Concurrent's marketing reach and acquire more customers faster while maintaining or reducing customer acquisition costs.

To achieve the intended goal, Concurrent used METADATA AMPLIFIER to generate a lead flow of the highest quality possible. Leads thus generated were of the highest quality Concurrent. has seen. In addition to the quality of leads coming in, Concurrent was able to achieve significant advertisement cost savings by optimizing their reach via multiple channels, getting the same person to engage with their message for a fraction of the cost, thus allowing a high marketing ROI.

In a three-week campaign, 500 accounts were targeted, and as many as 161 converted. METADATA delivered a three-fold increase in ROI when compared to previous campaigns, engaging over 33% of those accounts with Concurrent product demo and creating 4 new opportunities that week alone. In addition, METADATA drove 48% increase in net new conversions within the span of the promotion, and a 3.7 times increase in clicks-through rates when compared to Concurrent's best performing campaign in the past.

Implementation of the Present Invention

Figure 15:
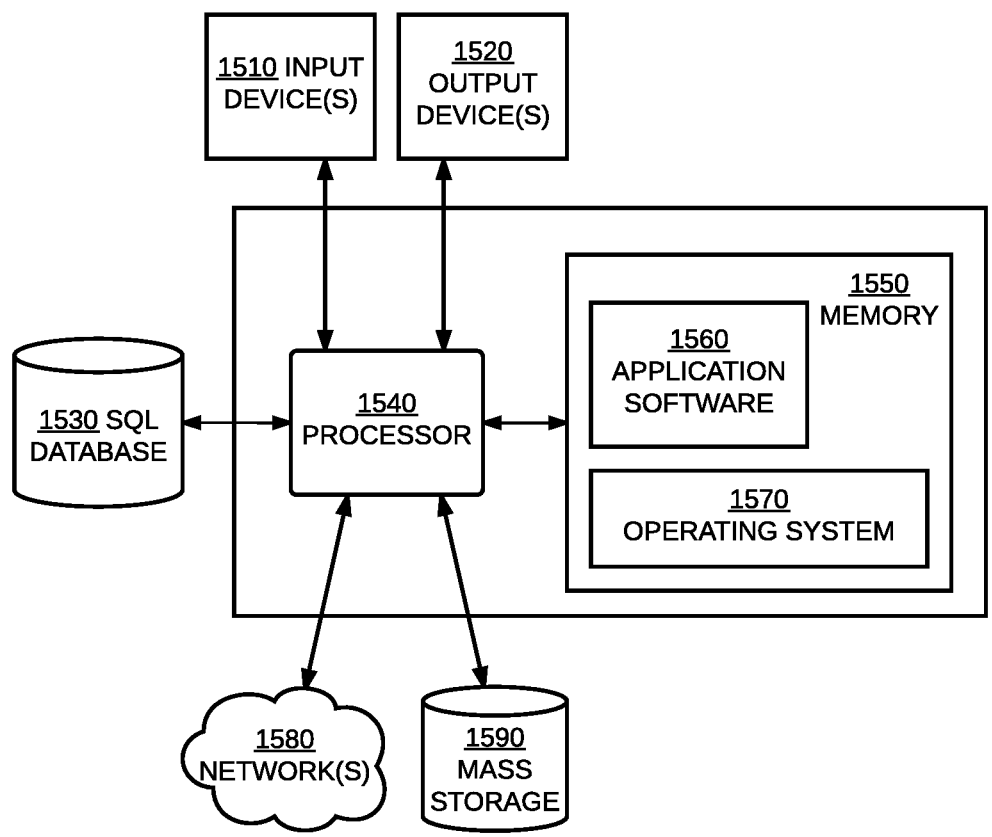
FIG. 15 is an illustrative hardware architecture diagram of a server for implementing one embodiment of the present invention.

The present invention may be implemented using server-based hardware and software. FIG. 15 shows an illustrative hardware architecture diagram 1500 of a server for implementing one embodiment of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor 1540 coupled to a memory 1550. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs 1510 and outputs 1520 for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices 1590, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface one or more external SQL databases 1530, as well as one or more networks 1580 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system 1570, and executes various computer software applications 1560, components, programs, codes, libraries, objects, modules, etc. indicated collectively by reference numerals to perform the methods, processes, and techniques described above.

Figure 16:
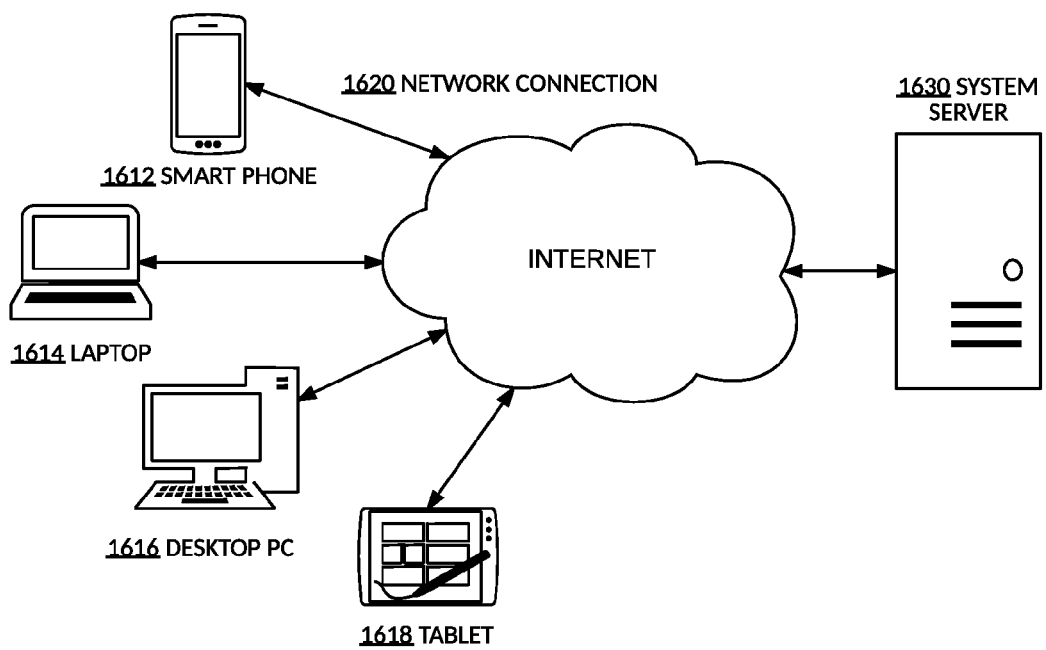
FIG. 16 is an illustrative system architecture for implementing one embodiment of the present invention in a client server environment.

The present invention may be implemented in a client server environment. FIG. 16 shows an illustrative system architecture 1600 for implementing one embodiment of the present invention in a client server environment. User devices 1610 on the client side may include smart phones 1612, laptops 1614, desktop PCs 1616, tablets 1618, or other devices. Such user devices 1610 access the service of the system server 1630 through some network connection 1620, such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A system for generating ideal and opt-in business leads utilizing targeted advertising campaigns through one or more channel advertising partners, comprising:
   a processor;
   a client-server connection to a Customer Relationship Management (CRM) system;
   a client-server connection to one or more lead data sources, wherein each lead data source is selected from the group consisting of a system database, a third party database, and a database of the one or more channel advertising partners; and
   a non-transitory, computer-readable storage medium for storing program code, wherein the program code encodes a leads engine, an enrichment engine, and a campaigns engine having access to a landing page module and the one or more channel advertising partners, and wherein the program code when executed by the processor causes the processor to:
   retrieve, utilizing the leads engine, an ideal customer profile (ICP) comprising a plurality of ICP attributes, wherein the plurality of ICP attributes was identified from one or more attributes of enriched, qualified leads with greater than zero opportunity amounts by:
   retrieving an original leads table and a lead opportunities table from the CRM system, wherein each lead in the original leads table comprises a plurality of lead attributes,
   performing an inner join operation on the original leads table and the lead opportunities table to generate a plurality of qualified leads, wherein an opportunity amount in the lead opportunities table of any lead selected by the inner join operation is greater than zero,
   obtaining a plurality of primary keys for the plurality of qualified leads from the CRM system, wherein the plurality of primary keys is selected from the group consisting of a name, an email, a domain name, a location, a company name, a company rank, a job function, and a company role,
   obtaining a plurality of secondary keys using the plurality of primary keys as keys into the one or more lead data sources to generate a plurality of enriched, qualified leads, wherein the plurality of secondary keys serve as primary keys for the one or more lead data sources,
   populating one or more attribute fields associated with the plurality of enriched, qualified leads with attribute values retrieved from the one or more lead data sources using the plurality of secondary keys, and
   identifying the plurality of ICP attributes using the attribute values of the one or more attribute fields associated with the plurality of enriched, qualified leads;
   retrieve, utilizing the enrichment engine, a first plurality of candidate leads each having a first plurality of candidate lead attributes that match the plurality of ICP attributes based on a match rate signal that measures a percentage of the first plurality of candidate lead attributes that match the plurality of ICP attributes, from the one or more lead data sources;
   retrieve, utilizing the enrichment engine, a second plurality of candidate leads as lookalikes of the first plurality of candidate leads from the one or more lead data sources;
   generate, utilizing the campaigns engine, one or more test advertising campaigns directed to a plurality of test target groups using the one or more channel advertising partners, wherein each of the plurality of test target groups comprises a plurality of test leads selected from among the first plurality and the second plurality of candidate leads, wherein each of the one or more test advertising campaigns comprises one or more landing pages;
   receive, utilizing the campaigns engine from the landing page module, feedback on the one or more test advertising campaigns from the plurality of test leads in the plurality of test target groups through the one or more landing pages;
   generate, utilizing the campaigns engine, a campaign score for each of the one or more test advertising campaigns based on the feedback received from the plurality of test leads in the plurality of test target groups, wherein the campaign score comprises at least a voluntary opt-in weight, and wherein the voluntary opt-in weight is non-zero if a test lead opts-in by clicking on the one or more landing pages;
   select, utilizing the campaigns engine, a plurality of ideal business leads from among the first plurality and the second plurality of candidate leads in response to feedback received from the one or more test advertising campaigns, wherein each of the plurality of ideal business leads matches a profile of a test target group with the voluntary opt-in weight of the campaign score being non-zero;

generate one or more main advertising campaigns to the plurality of ideal business leads using the one or more channel advertising partners;

receive responses from one or more of the plurality of ideal business leads; and generate a plurality of ideal and opt-in business leads by selecting from the plurality of ideal business leads that responded affirmatively to the one or more main advertising campaigns.

2. The system of claim 1, wherein the program code when executed by the processor, further causes the processor to:

receive feedback on the one or more test advertising campaigns from a user regarding the pluralities of test leads in the plurality of test target groups or from the CRM system corresponding to the pluralities of test leads in the plurality of test target groups, wherein the campaign score for each of the one or more test advertising campaigns is also based on the feedback received from the user regarding the pluralities of test leads in the plurality of test target groups, or a response from the CRM system corresponding to pluralities of the test leads in the plurality of test target groups.

3. The system of claim 1, wherein the program code when executed by the processor, further causes the processor to:

determine one or more clusters within the plurality of qualified leads by statistically analyzing one or more attributes of the plurality of qualified leads; and generate one or more lead scores indicating the probability of future transactions and transaction amounts for each of the one or more clusters within the plurality of qualified leads, wherein the identification of the ICP is based on a weighted combination of the one or more lead scores.

4. The system of claim 3, wherein the statistical analysis is selected from the group consisting of KMeans, regression analysis, decision tree analysis, Bayesian analysis, random forest, and weighted signal based on the one or more lead scores.

5. The system of claim 3, wherein the statistical analysis is based on machine learning of attributes of the candidate leads, and attributes of the pluralities of test leads in the plurality of test target groups.

6. The system of claim 1, wherein the one or more test advertising campaigns or the plurality of test target groups are compared using a method selected from the group consisting of A/B testing, indirect testing, probabilistic testing, and comparative testing.

7. The system of claim 1, wherein the generation of the one or more main advertising campaigns to the plurality of ideal business leads is by selecting from the test advertising campaigns according to results of an A/B test.

8. The system of claim 1, wherein each of the one or more test advertising campaigns and the one or more main advertising campaigns is associated with at least one of a campaign offer, an advertising channel partner, and a cost per lead (CPL).

9. The system of claim 1, wherein each of the one or more test advertising campaigns and the one or more main advertising campaigns comprises a plurality of sub-campaigns, wherein each sub-campaign is associated with a plurality of landing pages, and wherein the one or more test target groups comprise a plurality of candidate leads meeting a plurality of given criteria.

10. The system of claim 1, wherein the program code when executed by the processor, further causes the processor to, for each of the one or more test advertising campaigns:

determine whether the campaign score generated for the test advertising campaign is below a target threshold; and in response to determining that the campaign score generated for the test advertising campaign is below the target threshold, eliminate the test advertising campaign and the generated campaign score from the selection of the plurality of ideal business leads.

11. The system of claim 1, wherein the campaign score generated for each of the one or more test advertising campaigns further comprises one or more components, wherein all components are tested and grouped by their values, and wherein each components is configurable, and selected from the group consisting of a visit-to-form-submission conversion percentage, a total budget, an advertising cost per lead (CPL), the match rate signal, a previous or expected booking amount, a time to booking, an opportunity amount, an opportunity chance, a user manual feedback, and one or more lead scores provided by the CRM.

12. The system of claim 1, wherein the voluntary opt-in weight indicates a level of interest of a given candidate lead based on the given candidate lead's feedback to a given test campaign.

* * * * *